US009288501B2

(12) United States Patent
Zheng et al.

(10) Patent No.: US 9,288,501 B2
(45) Date of Patent: Mar. 15, 2016

(54) MOTION VECTOR PREDICTORS (MVPS) FOR BI-PREDICTIVE INTER MODE IN VIDEO CODING

(75) Inventors: Yunfei Zheng, Cupertino, CA (US); Wei-Jung Chien, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 591 days.

(21) Appl. No.: 13/352,175

(22) Filed: Jan. 17, 2012

(65) Prior Publication Data

US 2012/0230392 A1 Sep. 13, 2012

Related U.S. Application Data

(60) Provisional application No. 61/450,537, filed on Mar. 8, 2011.

(51) Int. Cl.
*H04N 7/28* (2006.01)
*H04N 19/463* (2014.01)
(Continued)

(52) U.S. Cl.
CPC ........... *H04N 19/463* (2014.11); *H04N 19/159* (2014.11); *H04N 19/176* (2014.11); *H04N 19/196* (2014.11); *H04N 19/197* (2014.11); *H04N 19/52* (2014.11)

(58) Field of Classification Search
CPC .................. H04N 19/00375; H04N 19/00551; H04N 19/00218; H04N 19/00696; H04N 19/00278; H04N 19/0036; H04N 19/197; H04N 19/52; H04N 19/463; H04N 19/176; H04N 19/196; H04N 19/159
USPC ............................ 375/240.02, 240.16, 240.12
See application file for complete search history.

(56) References Cited

U.S. PATENT DOCUMENTS

2004/0013309 A1 1/2004 Choi et al.
2004/0066848 A1 4/2004 Jeon
(Continued)

FOREIGN PATENT DOCUMENTS

CN 1306821 C 3/2007
CN 100581259 C 1/2010
(Continued)

OTHER PUBLICATIONS

Laroche et al. "RD Optimized Coding for Motion Vector Predictor Selection". IEEE Transactions on Circuits and Systems for Video Technology, vol. 18, No. 9, Sep. 2008, pp. 1247-1257.*
(Continued)

*Primary Examiner* — Christopher S Kelley
*Assistant Examiner* — Zhihan Zhou
(74) *Attorney, Agent, or Firm* — Shumaker & Sieffert, P.A.

(57) ABSTRACT

This disclosure describes video coding techniques applicable to a bi-predictive inter mode that uses adaptive motion vector prediction (AMVP). In particular, this disclosure describes techniques for encoding or decoding video data in which AMVP is used to code a first motion vector and a second motion vector associated with a current video block that is coded in the bi-predictive inter mode. More specifically, this disclosure describes techniques in which one motion vector of a bi-predictive video block can be used to define a candidate motion vector predictor (MVP) for predicting another motion vector of the bi-predictive video block. In many examples, a scaled version of the first motion vector of the bi-predictive video block is used as the MVP for the second motion vector of the bi-predictive video block. By defining an additional MVP candidate for the second motion vector of a bi-predictive video block, improved compression may be achieved.

51 Claims, 13 Drawing Sheets

(51) Int. Cl.
*H04N 19/196* (2014.01)
*H04N 19/52* (2014.01)
*H04N 19/159* (2014.01)
*H04N 19/176* (2014.01)

(56) References Cited

U.S. PATENT DOCUMENTS

| | | | |
|---|---|---|---|
| 2004/0218674 A1 | 11/2004 | Kondo et al. | |
| 2005/0063466 A1* | 3/2005 | Etoh et al. | 375/240.16 |
| 2007/0019731 A1 | 1/2007 | Huang | |
| 2009/0304083 A1 | 12/2009 | Gao et al. | |
| 2010/0208817 A1* | 8/2010 | Jeon et al. | 375/240.15 |
| 2010/0220790 A1* | 9/2010 | Jeon et al. | 375/240.16 |
| 2011/0080954 A1* | 4/2011 | Bossen et al. | 375/240.16 |
| 2011/0150095 A1* | 6/2011 | Choi et al. | 375/240.16 |
| 2012/0039383 A1* | 2/2012 | Huang et al. | 375/240.02 |

FOREIGN PATENT DOCUMENTS

| | | |
|---|---|---|
| CN | 101945276 A | 1/2011 |
| JP | 2004023458 A | 1/2004 |
| JP | 2004056756 A | 2/2004 |
| JP | 2004056823 A | 2/2004 |
| JP | 2004072712 A | 3/2004 |
| JP | 2004336369 A | 11/2004 |
| JP | 2006222985 A | 8/2006 |
| TW | 201031211 A | 8/2010 |
| WO | WO 2008153262 A1 * | 12/2008 |
| WO | WO 2009051419 A2 * | 4/2009 |
| WO | 2011041321 A1 | 4/2011 |
| WO | 2012005549 A2 | 1/2012 |
| WO | 2012006889 A1 | 1/2012 |
| WO | 2012008040 A1 | 1/2012 |

OTHER PUBLICATIONS

Fujibayashi, et al., "CE9 3.2d Simplified Motion vector prediction" JCTVC-D231, Joint Collaborative Team on Video Coding (JCT-VC) of ITU-T SG16 WP3 and ISO/IEC JTC1/SC29/WG11, 4th Meeting: Daegu, Korea, Jan. 20-28, 2011.

International Telecommunication Union, "ITU-T H.264, Series H: Audiovisual and Multimedia Systems, Infrastructure of audiovisual services—Coding of moving video, Advanced video coding for generic audiovisual services," Mar. 2010, 669 pp.

Ji, et al., "New bi-prediction techniques for b pictures coding" Institute of Computing Technology, Chinese Academy of Sciences, Beijing, China, Dept. of Computing Science, Harbin Institute of Technology, Harbin, China, 2004 IEEE.

International Search Report and Written Opinion of international application No. PCT/US2012/021885, dated Apr. 4, 2012, 12 pp.

Laroche, G. et al., "RD Optimized Coding for Motion Vector Predictor Selection," IEEE Transactions on Circuits and Systems for Video Technology, vol. 18, No. 12, Dec. 2008, 11 pp.

Zheng, Y. et al., "Extended Motion Vector Prediction for Bi predictive Mode", Joint Collaborative Team on Video Coding, Document: JCTVC-E343, Mar. 16-23, 2011, 4 pp.

Bross, et al., "WD4: Working Draft 4 of High-Efficiency Video Coding," JCTVC-F803_d2, (JCT-VC) of ITU-T SG16 WP3 and ISO/IEC JTC1/SC29/WG11 Joint Collaborative Team on Video Coding, 6th Meeting, Torino, IT, Jul. 14-22, 2011, 226 pp.

Bross, et al., "WD5: Working Draft 5 of High-Efficiency Video Coding," JCTVC-G1103_d2, (JCT-VC) of ITU-T SG16 WP3 and ISO/IEC JTC1/SC29/WG11 Joint Collaborative Team on Video Coding, 7th Meeting, Geneva, Switzerland (Nov. 2011), 214 pages.

International Preliminary Report on Patentability—PCT/US2012/021885, The International Bureau of WIPO—Geneva, Switzerland, Apr. 30, 2013, 25 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Wiegand, T., et al., "WD2: Working Draft 2 of High-Efficiency Video Coding", Jan. 28, 2011, No. JCTVC-D503, Jan. 28, 2011, XP002679642, Retrieved from the Internet: URL: http://wftp3.itu.int/av-arch/jctvc- site/2011_01_D_Daegu/ [retrieved on Jul. 11, 2012] (153 pages).

Wiegand, T., et al., "WD3: Working Draft 3 of High-Efficiency Video Coding," Document JCTVC-E603, 5th Meeting: Geneva, CH, Mar. 16-23, 2011, pp. 193.

Wiegand, T., et al.,"WD1: Working Draft 1 of High-Efficiency Video Coding", JCTVC-C403, Joint Collaborative Team on Video Coding (JCT-VC), of ITU-T SG16 WP3 and ISO/IEC JTC1/SC29/WG11, 3rd Meeting: Guangzhou, CN, Oct. 7-15, 2010 (137 pages).

Second Written Opinion of international application No. PCT/US2012/021885, dated Feb. 11, 2013, 6 pp.

Lin, et al., "Improved Advanced Motion Vector Prediction," JCT-VC Meeting; MPEG Meeting; Jan. 20, 2011-Jan. 28, 2011; MEGU; (Joint Collaborative Team on Video Coding of ITU-T SG. 16 WP3 and ISO/IEC JTC1/SC29/WG11); <URL: http://WFTP3.ITU.INT/AV-ARCH/JC TVC-SITE/>, No. JCTVC-D125, XP030008165, ISSN: 0000-0015; 8 pp.

McCann, et al., "Samsung's Response to the Call for Proposals on Video Compression Technology," Joint Collaborative Team on Video Coding (JCT-VC) of ITU-T SG-16 WP3 and ISO/IEC JTC1/SC29/WG11, 1st meeting, Document: JCTVC-A124, Dresden, DE, Apr. 15-23, 2010, 42 pp.

Sugio T., et al., "Modified usage of predicted motion vectors in forward directional bi-predictive coding frame", Joint Collaborative Team on Video Coding (JCT-VC) of ITU-T SG16 WP3 and ISO/IEC JTC1/SC29/WG11, 4th Meeting: Daegu, KR, Jan. 2011, JCTVC-D274, pp. 1-7.

Final Office Action from corresponding Japanese Application No. 2013-557717 dated Jun. 9, 2015 including translation (11 pages).

Park J., et al., "Improvements on median motion vectors of AMVP[online]," JCTVC-D095,Jan. 14, 2011,URL: http://phenix.it-sudparis.eu/jct/doc_end_user/documents/4_Daegu/wg11/JCTVC-D095-v1.zip (7 pages).

* cited by examiner

MOTION VECTOR PREDICTORS (MVPS) FOR BI-PREDICTIVE INTER MODE IN VIDEO CODING

This application claims the benefit of U.S. Provisional Application No. 61/450,537, filed on Mar. 8, 2011, the entire content of which is incorporated herein by reference.

TECHNICAL FIELD

This disclosure relates to video coding techniques used to compress video data and, more particularly, to adaptive motion vector prediction (AMVP) used in video compression.

BACKGROUND

Digital video capabilities can be incorporated into a wide range of video devices, including digital televisions, digital direct broadcast systems, wireless communication devices such as wireless telephone handsets, wireless broadcast systems, personal digital assistants (PDAs), laptop or desktop computers, tablet computers, digital cameras, digital recording devices, video gaming devices, video game consoles, personal multimedia players, and the like. Such video devices may implement video compression techniques, such as those described in MPEG-2, MPEG-4, or ITU-T H.264/MPEG-4, Part 10, Advanced Video Coding (AVC), in order compress video data. Video compression techniques perform spatial and/or temporal prediction to reduce or remove redundancy inherent in video sequences. New video standards, such as the High Efficiency Video Coding (HEVC) standard being developed by the "Joint Collaborative Team—Video Coding" (JCTVC), which is a collaboration between MPEG and ITU-T, continue to emerge and evolve. The emerging HEVC standard is sometimes referred to as H.265.

These and other video coding standards and techniques use block-based video coding. Block-based video coding techniques divide the video data of a video frame (or portion thereof) into video blocks and then encode the video blocks using predictive block-based compression techniques. The video blocks may be further divided into video block partitions. The video blocks (or partitions thereof) may be referred to as coding units (CUs) or prediction units (PUs) and may be encoded using one or more video-specific encoding techniques as well as general data compression techniques. Different modes may be selected and used to code the video blocks.

With the emerging HEVC standard, largest coding units (LCUs) may be divided into smaller and smaller CUs according to a quadtree partitioning scheme. The CUs may be predicted based on so-called PUs, which can have partition block sizes corresponding to the size of the CUs or smaller than the size of the CUs, such that multiple PUs can be used to predict a given CU.

Different modes may be used to encode the CUs. For example, different intra coding modes may be used to code the CUs based on predictive data within the same frame or slice so as to exploit spatial redundancy within a video frame. Alternatively, inter coding modes may be used to code CUs based on predictive data from another frame or slice, so as to exploit temporal redundancy across frames of a video sequence. After the predictive coding is performed according to a selected mode, transform coding may then be performed, such as discrete cosine transforms (DCT), integer transforms or the like. With HEVC, the transform coding may occur with respect to transform units (TUs), which can also have varying transform sizes in the HEVC standard. Quantization of the transform coefficients, scanning of the quantized transform coefficients, and entropy coding may also be performed. Syntax information is signaled with encoded video data, e.g., in a video slice header or video block header, in order to inform the decoder how to decode the video data. Among other things, the syntax information may identify the mode that was used in the video coding of different video blocks.

SUMMARY

This disclosure describes video encoding and decoding techniques applicable to a bi-predictive inter mode that uses adaptive motion vector prediction (AMVP). In particular, this disclosure describes techniques for encoding or decoding video data in which AMVP is used to code a first motion vector and a second motion vector associated with a current video block that is coded in the bi-predictive inter mode. More specifically, this disclosure describes techniques in which one motion vector of a bi-predictive video block can be used to define a candidate motion vector predictor (MVP) for predicting another motion vector of the bi-predictive video block. In many examples, a scaled version of the first motion vector of the bi-predictive video block is used as the MVP for the second motion vector of the bi-predictive video block. In this way, by defining an additional MVP candidate for the second motion vector of a bi-predictive video block, improved compression may be achieved.

In one example, this disclosure describes a method of decoding video data in which AMVP is used to code a first motion vector and a second motion vector associated with a current video block that is coded in a bi-predictive inter mode. The method comprises receiving a first motion vector difference (MVD) associated with the first motion vector, receiving a first index that identifies a first MVP, and generating the first motion vector based on the first MVD and the first MVP. The method also comprises receiving a second MVD associated with the second motion vector, receiving a second index that identifies a second MVP, wherein the second MVP is defined based on the first motion vector, and generating the second motion vector based on the second MVD and the second MVP.

In another example, this disclosure describes a method of encoding video data in which AMVP is used to code a first motion vector and a second motion vector associated with a current video block in accordance with a bi-predictive inter mode. The method comprises determining the first motion vector to be used to code the current video block in the bi-predictive inter mode, identifying a first MVP based on a first set of motion vectors associated with one or more neighboring video blocks, generating a first index that identifies the first MVP, and generating a first MVD based on the first motion vector and the first MVP. The method also comprises determining the second motion vector to be used to code the current video block in the bi-predictive inter mode, identifying a second MVP based on a second set of motion vectors, wherein the second set of motion vectors include motion vectors associated with one or more of the neighboring video blocks and a candidate based on the first motion vector, generating a second index that identifies the second MVP, generating a second MVD based on the second motion vector and the second MVP, and outputting the first index, the first MVD, the second index and the second MVD as part of an encoded bitstream for the current video block.

In another example, this disclosure describes video decoding device that decodes video data. The video decoding device comprises a video decoder configured to receive a first MVD associated with the first motion vector, receive a first index that identifies a first MVP, and generate the first motion vector based on the first MVD and the first MVP. The video decoder is also configured to receive a second MVD associated with the second motion vector, receive a second index that identifies a second MVP, wherein the second MVP is defined based on the first motion vector, and generate the second motion vector based on the second MVD and the second MVP.

In another example, this disclosure describes video encoding device that encodes video data. The video encoding device comprises a video encoder configured to determine the first motion vector to be used to code the current video block in the bi-predictive inter mode, identify a first MVP based on a first set of motion vectors associated with one or more neighboring video blocks, generate a first index that identifies the first MVP, and generate a first MVD based on the first motion vector and the first MVP. The video encoder is also configured to determine the second motion vector to be used to code the current video block in the bi-predictive inter mode, identify a second MVP based on a second set of motion vectors, wherein the second set of motion vectors include motion vectors associated with one or more of the neighboring video blocks and a candidate based on the first motion vector, generate a second index that identifies the second MVP, generate a second MVD based on the second motion vector and the second MVP, and output the first index, the first MVD, the second index and the second MVD as part of an encoded bitstream for the current video block.

In another example, this disclosure describes a device for decoding video data in which AMVP is used to code a first motion vector and a second motion vector associated with a current video block that is coded in a bi-predictive inter mode. The device comprises means for receiving a first MVD associated with the first motion vector, means for receiving a first index that identifies a first MVP, means for generating the first motion vector based on the first MVD and the first MVP, means for receiving a second MVD associated with the second motion vector, means for receiving a second index that identifies a second MVP, wherein the second MVP is defined based on the first motion vector, and means for generating the second motion vector based on the second MVD and the second MVP.

In another example, this disclosure describes a device for encoding video data in which AMVP is used to code a first motion vector and a second motion vector associated with a current video block in accordance with a bi-predictive inter mode. The device comprises means for determining the first motion vector to be used to code the current video block in the bi-predictive inter mode, means for identifying a first MVP based on a first set of motion vectors associated with one or more neighboring video blocks, means for generating a first index that identifies the first MVP, means for generating a first MVD based on the first motion vector and the first MVP, means for determining the second motion vector to be used to code the current video block in the bi-predictive inter mode, means for identifying a second MVP based on a second set of motion vectors, wherein the second set of motion vectors include motion vectors associated with one or more of the neighboring video blocks and a candidate based on the first motion vector, means for generating a second index that identifies the second MVP, means for generating a second MVD based on the second motion vector and the second MVP, and means for outputting the first index, the first MVD, the second index and the second MVD as part of an encoded bitstream for the current video block.

The techniques described in this disclosure may be implemented in hardware, software, firmware, or any combination thereof. For example, various techniques may be implemented or executed by one or more processors. As used herein, a processor may refer to a microprocessor, an application specific integrated circuit (ASIC), a field programmable gate array (FPGA), a digital signal processor (DSP), or other equivalent integrated or discrete logic circuitry. Software may be executed by one or more processors. Software comprising instructions that execute the techniques may be initially stored in a computer-readable medium and loaded and executed by a processor.

Accordingly, this disclosure also contemplates computer-readable storage media comprising instructions that cause a processor to perform any the techniques described in this disclosure. In some cases, the computer-readable storage medium may form part of a computer program storage product, which may be sold to manufacturers and/or used in a device. The computer program product may include the computer-readable medium, and in some cases, may also include packaging materials.

In particular, this disclosure also describes a computer-readable medium comprising instructions that upon execution cause a processor to decode video data in which AMVP is used to code a first motion vector and a second motion vector associated with a current video block that is coded in a bi-predictive inter mode. The instructions cause the processor to upon receiving a first MVD associated with the first motion vector, and upon receiving a first index that identifies a first MVP, generate the first motion vector based on the first MVD and the first MVP. In addition, the instructions cause the processor to upon receiving a second MVD associated with the second motion vector, and upon receiving a second index that identifies a second MVP, wherein the second MVP is defined based on the first motion vector, generate the second motion vector based on the second MVD and the second MVP.

In yet another example, this disclosure describes a computer-readable medium comprising instructions that upon execution cause a processor to encode video data in which AMVP is used to code a first motion vector and a second motion vector associated with a current video block in accordance with a bi-predictive inter mode. The instructions cause the processor to determine the first motion vector to be used to code the current video block in the bi-predictive inter mode, identify a first MVP based on a first set of motion vectors associated with one or more neighboring video blocks, generate a first index that identifies the first MVP, generate a first MVD based on the first motion vector and the first MVP, determine the second motion vector to be used to code the current video block in the bi-predictive inter mode, identify a second MVP based on a second set of motion vectors, wherein the second set of motion vectors include motion vectors associated with one or more of the neighboring video blocks and a candidate based on the first motion vector, generate a second index that identifies the second MVP, generate a second MVD based on the second motion vector and the second MVP, and output the first index, the first MVD, the second index and the second MVD as part of an encoded bitstream for the current video block.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

This disclosure describes video encoding and decoding techniques applicable to a bi-predictive inter mode that uses adaptive motion vector prediction (AMVP). With AMVP, motion vectors are encoded as difference values (i.e., deltas) relative to other motion vectors, such as the motion vectors associated with neighboring blocks. An index may be used to define which neighboring video block is used to encode a current motion vector according to AMVP. In particular, this disclosure describes techniques for encoding or decoding video data in which adaptive AMVP is used to code a first motion vector and a second motion vector associated with a current video block that is coded in the bi-predictive inter mode. Bi-predictive inter mode refers to any video coding mode in which a video block is coded based on two different motion vectors associated with two predictive video blocks.

More specifically, this disclosure describes techniques in which one motion vector of a bi-predictive video block can be used to define a candidate motion vector predictor (MVP) for predicting another motion vector of the bi-predictive video block. In many examples, a scaled version of the first motion vector of the bi-predictive video block is used as the MVP for the second motion vector of the bi-predictive video block. In this way, by defining an additional MVP candidate for the second motion vector of a bi-predictive video block, improved compression can be achieved.

In most video coding systems, motion estimation and motion compensation are used to reduce the temporal redundancy in a video sequence, in order to achieve data compression. In this case, a motion vector can be generated so as to identify a predictive block of video data, e.g., from another video frame or slice, which can be used to predict the values of the current video block being coded. The values of the predictive video block are subtracted from the values of the current video block to produce a block of residual data. The motion vector is communicated from the encoder to the decoder, along with the residual data. The decoder can locate the same predictive block (based on the motion vector) and reconstruct the encoded video block by combining the residual data with the data of the predictive block. Many other compression techniques can also be used, such as transforms and entropy coding, to further improve the video compression.

The motion estimation process is usually done at the encoder. Motion information (such as motion vectors, motion vector indexes, prediction directions, or other information) can be included in an encoded bitstream, which may be stored and accessed by a decoder or transmitted from the encoder to the decoder. Based on the motion information in the encoded bitstream, the decoder can identify a predictive block used to encode a given video block.

Figure 6:
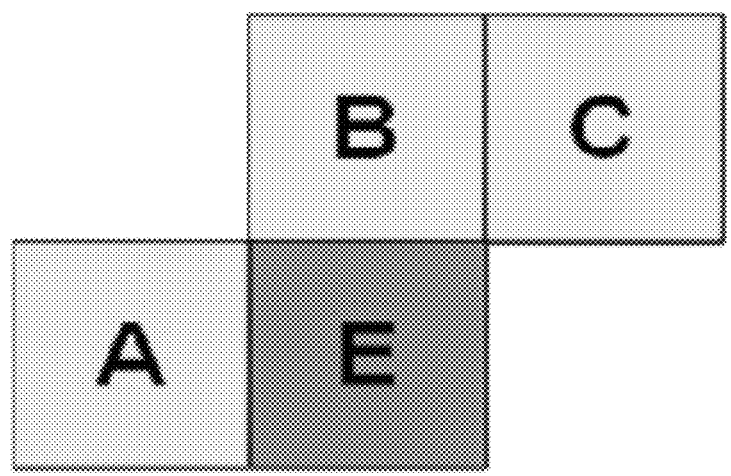
FIG. 6 is a conceptual diagram illustrating the location of different neighboring video blocks relative to current video block such that the current video block may use information of one or more different neighboring video blocks in a bi-predictive inter mode, consistent with this disclosure.

In some cases, predictive coding of motion vectors is applied to further reduce the amount of data needed to communicate the motion vector. In this case, rather than encoding and communicating the motion vector itself, the encoder encodes and communicates a motion vector difference (MVD) relative to a known (or knowable) motion vector. In some cases, the known motion vector, which may be used with the MVD to define the current motion vector, can be defined by a so-called motion vector predictor (MVP), which may be derived as the median of motion vectors associated with neighboring blocks (such as neighbor blocks X, Y, and Z as shown in FIG. 6). To be a valid candidate MVP, a given motion vector may be required to point to the same video frame as the motion vector currently being coded by the MVP and the MVD.

A more advanced technique, referred to as adaptive motion vector prediction (AMVP), has been proposed to build a motion vector candidate set by including several neighboring blocks in spatial and temporal directions as candidates for MVP. In this case, the encoder can select the most accurate predictor from the candidate set based on analysis of encoding rate and distortion (e.g., using so-called rate-distortion cost analysis). A motion vector predictor index (mvp_idx) can be transmitted to a decoder to inform the decoder where to locate the MVP. The index generally refers to any information that identifies an MVP from a set of MVP candidates. The MVD is also communicated. The decoder can combine the MVD with the MVP (defined by the motion vector predictor index) so as to reconstruct the motion vector. The decoder (like the encoder) can define the set of candidate MVPs to which the index is applied based on various criteria. The encoder and the decoder may be programmed to know how indexes map to MVP candidates, and these mappings may even adapt over time, e.g., based on statistics of previously coded video blocks that use AMVP.

Some video coding modes provide for two different motion vectors in order to predict one video block. So called bi-prediction, for example, may allow for the creation of a predictive video block based on a combination (sometimes weighted) of two different predictive video blocks. Thus, with such bi-predictive inter modes, two different motion vectors are used for the prediction process.

This disclosure describes techniques in which one motion vector of a bi-predictive video block can be used to define a candidate MVP for predicting another motion vector of the bi-predictive video block. In many examples, a scaled version of the first motion vector of the bi-predictive video block is used as the MVP for the second motion vector of the bi-predictive video block. In this way, by defining an additional MVP candidate for the second motion vector of a bi-predictive video block, improved compression can be achieved.

Figure 1:
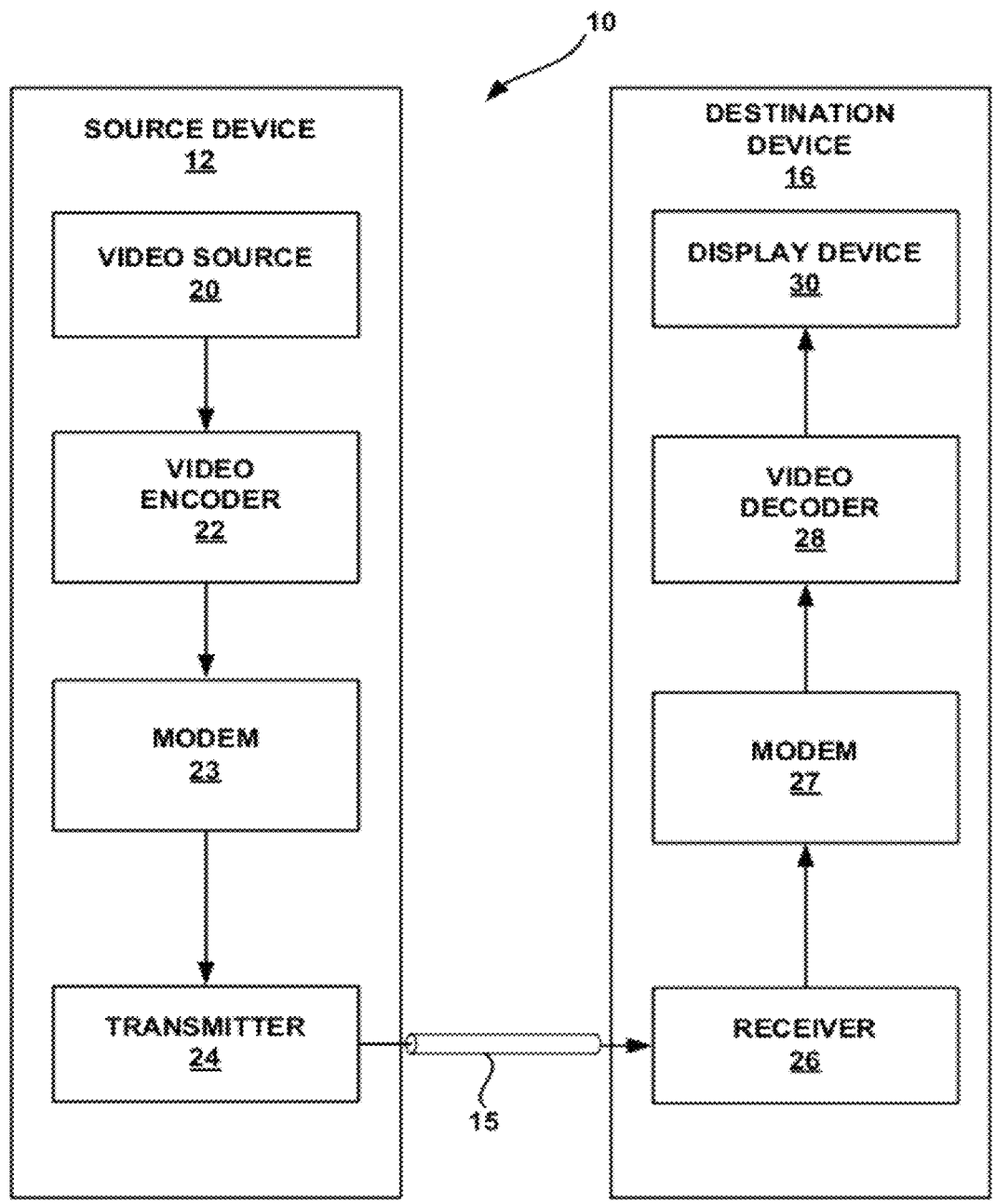
FIG. 1 is a block diagram illustrating one exemplary video encoding and decoding system that may implement one or more of the techniques of this disclosure.

FIG. 1 is a block diagram illustrating an exemplary video encoding and decoding system 10 that may implement techniques of this disclosure. As shown in FIG. 1, system 10 includes a source device 12 that transmits encoded video to a destination device 16 via a communication channel 15. Source device 12 and destination device 16 may comprise any of a wide range of devices. In some cases, source device 12 and destination device 16 may comprise wireless communication device handsets, such as so-called cellular or satellite radiotelephones. The techniques of this disclosure, however, which apply generally to the encoding and decoding of video blocks in bi-predictive inter mode may be applied to non-wireless devices including video encoding and/or decoding capabilities. Source device 12 and destination device 16 are merely examples of coding devices that can support the techniques described herein. For example, the techniques may be applied by an encoding device in order to store an encoded bitstream, or the techniques may be applied by a decoding device with respect to a stored or communicated (e.g., streaming) bitstream.

In the example of FIG. 1, source device 12 may include a video source 20, a video encoder 22, a modulator/demodulator (modem) 23 and a transmitter 24. Destination device 16 may include a receiver 26, a modem 27, a video decoder 28, and a display device 30. In accordance with this disclosure, video encoder 22 of source device 12 may be configured to encode one or more video blocks according to a bi-predictive inter mode. With bi-predictive inter mode that uses AMVP, a video block may predicted based on two different motion vectors. The motion vectors may be defined by index values that define the MVPs for the motion vectors, and by motion vector differences (MVDs) that define the differences (or deltas) of the motion vectors relative to the MVPs. The decoder can combine an MVP with the corresponding MVD to define a given motion vector. Syntax elements may be generated at video encoder 22 in order to identify the indexes for the MVPs, and to define the MVDs for the different predicted motion vectors. A video decoder can reconstruct a bi-predictive video block based on MVPs and MVDs defined by the syntax elements.

More specifically, video encoder 22 may select a bi-predictive inter mode for encoding a current video block, and to identify two different MVPs used for the motion vectors. Video encoder 22 may generate the MVDs as the difference between the motion vectors and the corresponding MVPs used to code the motion vectors. Video encoder 22 may generate one or more syntax elements to identify the MVPs and the MVDs to a video decoder. Again, this disclosure describes techniques in which one motion vector of a bi-predictive video block can be used to define a candidate MVP for predicting another motion vector of the bi-predictive video block. For example, a scaled version of the first motion vector of the bi-predictive video block is used as the MVP for the second motion vector of the bi-predictive video block, which may improve data compression. A number of different scaling techniques are explained in greater detail below.

Video source 20 may comprise a video capture device, such as a video camera, a video archive containing previously captured video, a video feed from a video content provider or another source of video. As a further alternative, video source 20 may generate computer graphics-based data as the source video, or a combination of live video, archived video, and computer-generated video. In some cases, if video source 20 is a video camera, source device 12 and destination device 16 may form so-called camera phones or video phones. In each case, the captured, pre-captured or computer-generated video may be encoded by video encoder 22.

Once the video data is encoded by video encoder 22, the encoded video information may then be modulated by modem 23 according to a communication standard, e.g., such as code division multiple access (CDMA), orthogonal frequency division multiplexing (OFDM) or any other communication standard or technique. The encoded and modulated data can then be transmitted to destination device 16 via transmitter 24. Modem 23 may include various mixers, filters, amplifiers or other components designed for signal modulation. Transmitter 24 may include circuits designed for transmitting data, including amplifiers, filters, and one or more antennas. Receiver 26 of destination device 16 receives information over channel 15, and modem 27 demodulates the information.

The video decoding process performed by video decoder 28 may include reciprocal techniques to the encoding techniques performed by video encoder 22. In particular, video decoder 28 may receive one or more syntax elements for a current video block, wherein the current video block is encoded according to a bi-predictive inter mode, and based on the one or more syntax elements, identify MVPs and MVDs. Video decoder may use the received MVPs and MVDs to decode a current video block according to the bi-predictive inter mode.

Communication channel 15 is shown only for illustrative purposes, and is not necessary in many examples. In FIG. 1, communication channel 15 may comprise any wireless or wired communication medium, such as a radio frequency (RF) spectrum or one or more physical transmission lines, or any combination of wireless and wired media. Communication channel 15 may form part of a packet-based network, such as a local area network, a wide-area network, or a global network such as the Internet. Communication channel 15 generally represents any suitable communication medium, or collection of different communication media, for transmitting video data from source device 12 to destination device 16. Again, FIG. 1 is merely exemplary and the techniques of this disclosure may apply to video coding settings (e.g., video encoding or video decoding) that do not necessarily include any data communication between the encoding and decoding devices. In other examples, data could be retrieved from a local memory, streamed over a network, or the like.

In some cases, video encoder 22 and video decoder 28 may operate substantially according to a video compression standard such as the emerging HEVC standard. However, the techniques of this disclosure may also be applied in the context of a variety of other video coding standards, including some old standards, or new or emerging standards. Although not shown in FIG. 1, in some cases, video encoder 22 and video decoder 28 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 22 and video decoder 28 each may be implemented as one or more microprocessors, digital signal processors (DSPs), application specific integrated circuits (ASICs), field programmable gate arrays (FPGAs), discrete logic, software, hardware, firmware or combinations thereof. Each of video encoder 22 and video decoder 28 may be included in one or more encoders or decoders, either of which may be integrated as part of a combined encoder/decoder (CODEC) in a respective mobile device, subscriber device, broadcast device, server, or the like. In this disclosure, the term coder refers to an encoder, a decoder, or CODEC, and the terms coder, encoder, decoder and CODEC all refer to specific machines designed for the coding (encoding and/or decoding) of video data consistent with this disclosure.

In some cases, devices 12, 16 may operate in a substantially symmetrical manner. For example, each of devices 12, 16 may include video encoding and decoding components. Hence, system 10 may support one-way or two-way video transmission between video devices 12, 16, e.g., for video streaming, video playback, video broadcasting, or video telephony.

During the encoding process, video encoder 22 may execute a number of coding techniques or operations. In general, video encoder 22 operates on blocks of video data consistent with the HEVC standard. Consistent with HEVC, the video blocks are referred to as coding units (CUs) and many CUs exist within individual video frames (or other independently defined units of video, such as slices). Frames, slices, portions of frames, groups of pictures, or other data structures may be defined as units of video information that include a plurality of CUs. The CUs may have varying sizes consistent with the HEVC standard, and the bitstream may define largest coding units (LCUs) as the largest size of CU. The bi-predictive inter mode may be used to encode LCUs, CUs, or possibly other types of video blocks. With the HEVC standard, LCUs may be divided into smaller and smaller CUs according to a quadtree partitioning scheme, and the different CUs that are defined in the scheme may be further partitioned into so-called prediction units (PUs). The LCUs, CUs, and PUs are all video blocks within the meaning of this disclosure.

Video encoder 22 may perform predictive coding in which a video block being coded (e.g., a PU of a CU within an LCU) is compared to one or more predictive candidates in order to identify a predictive block. This process of predictive coding may be intra (in which case the predictive data is generated based on neighboring intra data within the same video frame or slice) or inter (in which case the predictive data is generated based on video data in previous or subsequent frames or slices). Many different coding modes may be supported, and video encoder 22 may select a desirable video coding mode. According to this disclosure, at least some video blocks may be coded using the bi-predictive inter mode described herein. The bi-predictive inter mode may refer to any of several possible bi-predictive inter modes, which may be defined differently for different block sizes or different weighting allocations for the two predictive blocks identified by the two motion vectors.

With a bi-predictive inter mode, a predictive block may be generated as a combination of two predictive blocks, e.g., possibly a weighted combination. The first predictive block is generated based on a first motion vector and the second predictive block is generated based on a second motion vector. The first motion vector is defined by an index that defines an MVP and an MVD, while the second motion vector is defined by another index that defines another MVP and another MVD. According to this disclosure, at least one of the MVP candidates for the second motion vector may be generated based on the first motion vector.

After generating the predictive block, the differences between the current video block being coded and the predictive block are coded as a residual block, and prediction syntax is used to identify the predictive block. With the bi-predictive inter mode described herein, the prediction syntax (e.g., syntax elements) may identify the MVDs and MVPs to a video decoder. Accordingly, the decoder can use the MVDs and MVPs to decode a current video block according to the bi-predictive inter mode.

The residual block may be transformed and quantized. Transform techniques may comprise a DCT process or conceptually similar process, integer transforms, wavelet transforms, or other types of transforms. In a DCT process, as an example, the transform process converts a set of pixel values (e.g., residual pixel values) into transform coefficients, which may represent the energy of the pixel values in the frequency domain. The HEVC standard allows for transformations according to transform units (TUs), which may be different for different CUs. In particular, residual samples corresponding to a CU may be subdivided into smaller units using a quadtree structure known as "residual quad tree" (RQT). The leaf nodes of the RQT may be referred as the TUs. The TUs are may be transformed and quantized.

Quantization may be applied to the transform coefficients, and generally involves a process that limits the number of bits associated with any given transform coefficient. More specifically, quantization may be applied according to a quantization parameter (QP) defined at the LCU level. Accordingly, the same level of quantization may be applied to all transform coefficients in the TUs associated with different PUs of CUs within an LCU. However, rather than signal the QP itself, a change (i.e., a delta) in the QP may be signaled with the LCU to indicate the change in QP relative to that of a previous LCU.

Following transform and quantization, entropy coding may be performed on the quantized and transformed residual video blocks. Syntax elements may also be included in the entropy coded bitstream. In general, entropy coding comprises one or more processes that collectively compress a sequence of quantized transform coefficients and/or other syntax information. Scanning techniques may be performed on the quantized transform coefficients in order to define one or more serialized one-dimensional vectors of coefficients from two-dimensional video blocks. The scanned coefficients are then entropy coded along with any syntax information, e.g., via content adaptive variable length coding (CAVLC), context adaptive binary arithmetic coding (CABAC), or another entropy coding process.

As part of the encoding process, encoded video blocks may be decoded in order to generate the video data that is used for subsequent prediction-based coding of subsequent video blocks. This is often referred to as a decoding loop of the encoding process, and generally mimics the decoding that is performed by a decoder device. In the decoding loop of an encoder or a decoder, filtering techniques may be used to improve video quality, and e.g., smooth pixel boundaries and possibly remove artifacts from decoded video. This filtering may be in-loop or post-loop. With in-loop filtering, the filtering of reconstructed video data occurs in the coding loop, which means that the filtered data is stored by an encoder or a decoder for subsequent use in the prediction of subsequent image data. In contrast, with post-loop filtering the filtering of reconstructed video data occurs out of the coding loop, which means that unfiltered versions of the data are stored by an encoder or a decoder for subsequent use in the prediction of subsequent image data. The in-loop or post-loop filtering often follows a separate deblock filtering process, which typically applies filtering to pixels that are on or near boundaries of adjacent video blocks in order to remove blockiness artifacts that manifest at video block boundaries. The deblock filtering may also be performed in-loop or post-loop.

Relative to previous coding standards, the emerging HEVC standard introduces new terms and block sizes for video blocks. In particular, HEVC refers to coding units (CUs), which can be partitioned according to a quadtree partitioning scheme. An "LCU" refers to the largest sized coding unit (e.g., the "largest coding unit") supported in a given situation. The LCU size may itself be signaled as part of the bitstream, e.g., as sequence level syntax. The LCU can be partitioned into smaller CUs. The CUs may be partitioned into prediction units (PUs) for purposes of prediction. The PUs may have square or rectangular shapes, although other shapes may also be used. Transforms are not fixed in the emerging HEVC standard, but are defined according to transform unit (TU) sizes, which may be the same size as a given CU, or possibly smaller. The residual data for a given CU may be communicated in the TUs. Syntax elements may be defined at the LCU level, the CU level, the PU level and the TU level.

Figure 2:
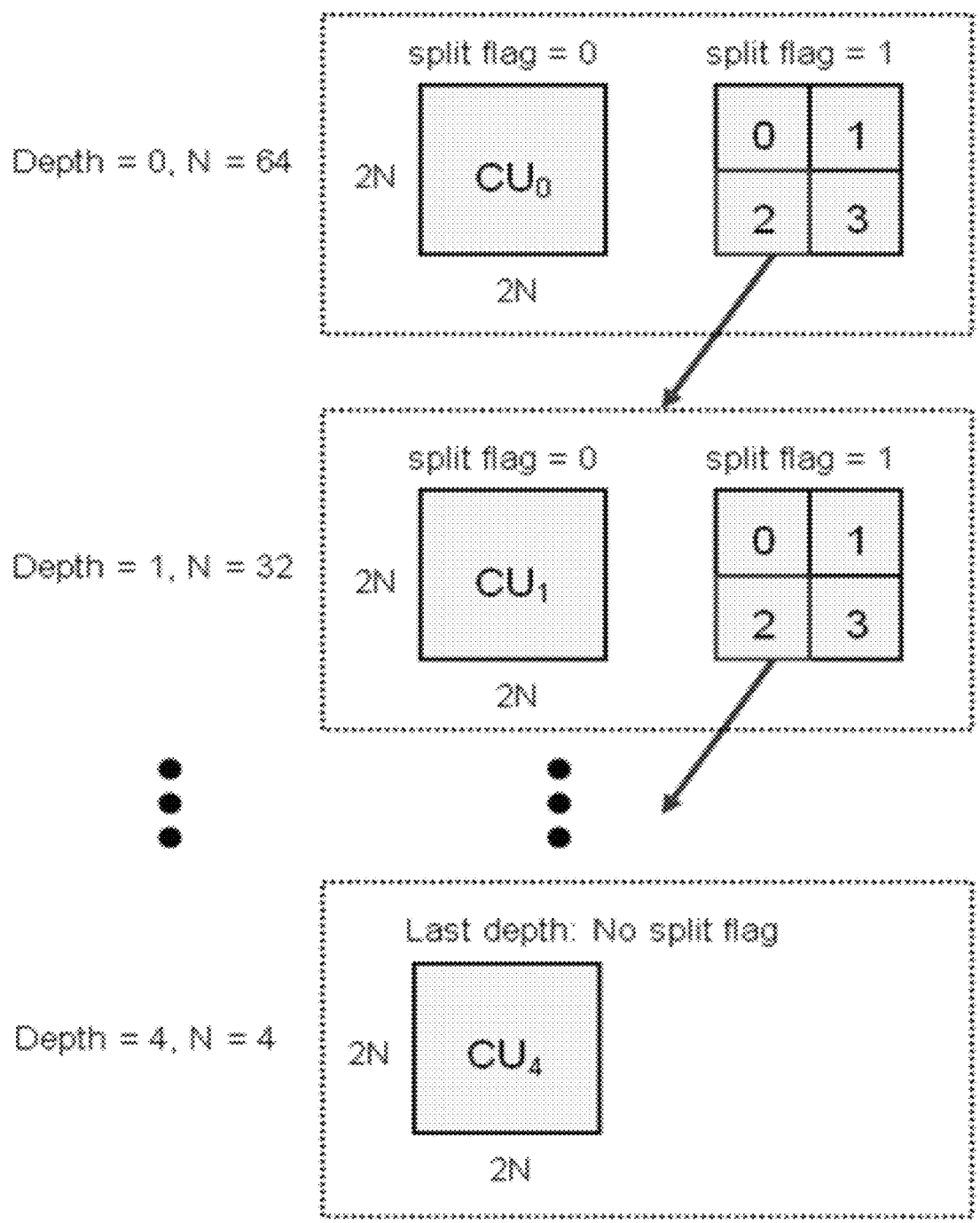
FIG. 2 is a conceptual diagram illustrating quadtree partitioning of coding units (CUs) consistent with the techniques of this disclosure.

To illustrate video blocks according to the HEVC standard, FIG. 2 conceptually shows an LCU of depth 64 by 64, which is then partitioned into smaller CUs according to a quadtree partitioning scheme. Elements called "split flags" may be included as CU-level syntax to indicate whether any given CU is itself sub-divided into four more CUs. In FIG. 2, $CU_0$ may comprise the LCU, $CU_1$ through $CU_4$ may comprise sub-CUs of the LCU. The bi-predictive inter mode syntax elements, as described in this disclosure, may be defined at the CU level (or possibly the LCU level if the LCU is not split into smaller CUs). Bi-predictive inter mode might also be supported for PUs of CUs, in some examples.

Figure 3:
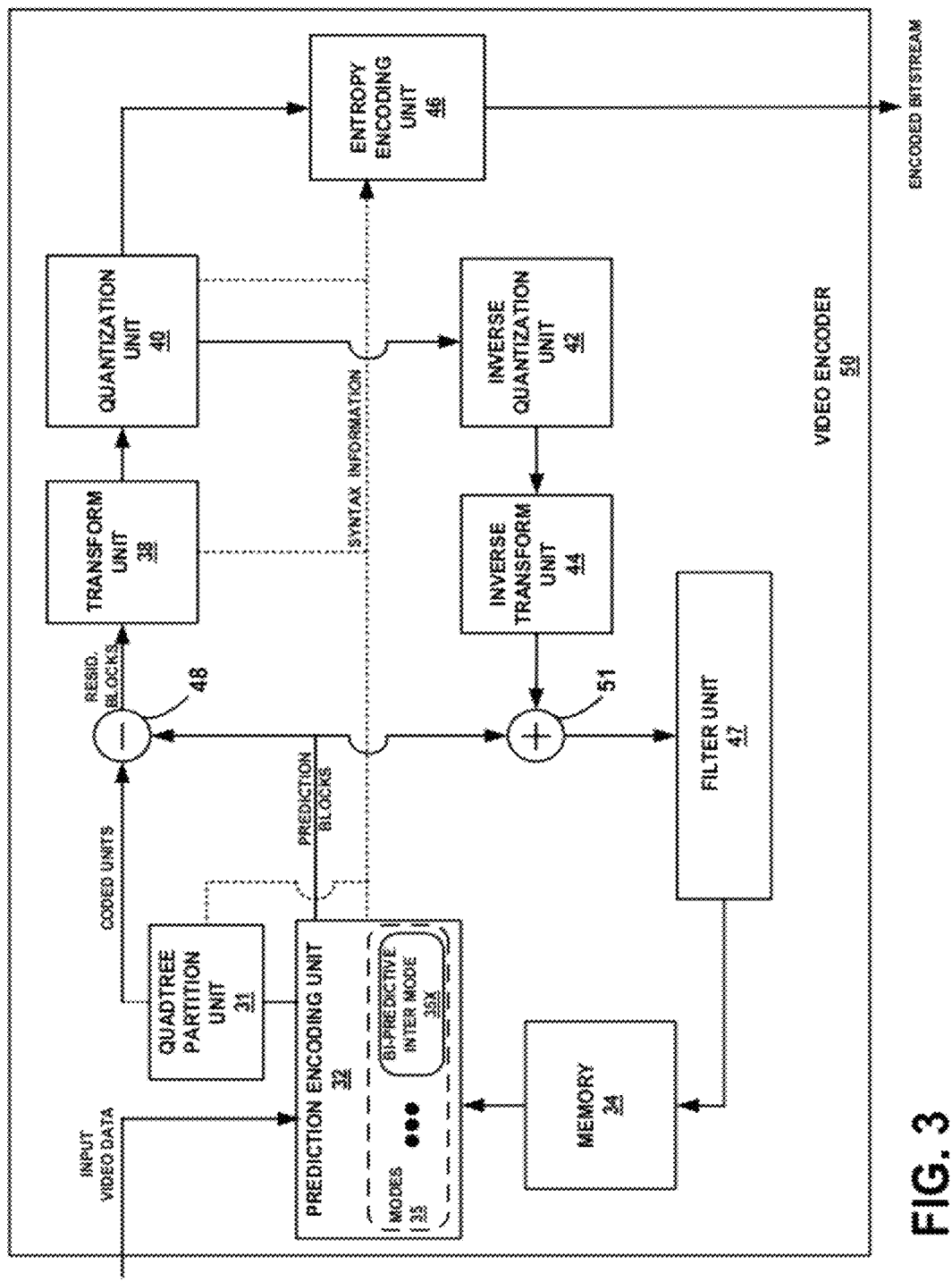
FIG. 3 is block diagram illustrating a video encoder that may implement techniques of this disclosure.

FIG. 3 is a block diagram illustrating a video encoder 50 consistent with this disclosure. Video encoder 50 may correspond to video encoder 22 of device 20, or a video encoder of a different device. As shown in FIG. 3, video encoder 50 includes a prediction encoding unit 32 quadtree partition unit 31, adders 48 and 51, and a memory 34. Video encoder 50 also includes a transform unit 38 and a quantization unit 40, as well as an inverse quantization unit 42 and an inverse transform unit 44. Video encoder 50 also includes an entropy coding unit 46, and a filter unit 47, which may include deblock filters and post loop and/or in loop filters. The encoded video data and syntax information that defines the manner of the encoding may be communicated to entropy encoding unit 46, which performs entropy encoding on the bitstream.

As shown in FIG. 3, prediction encoding unit 32 may support a plurality of different coding modes 35 in the encoding of video blocks. Modes 35 may include inter coding modes that define predictive data from different video frames (or slices). The inter coding modes may be bi-predictive, meaning that two different lists (e.g., List 0 and List 1) of predictive data (and typically two different motion vectors) are used to identify the predictive data. The inter coding modes may alternatively be uni-predictive, meaning that one list (e.g., List 0) of predictive data (and typically one motion vector) is used to identify the predictive data. Interpolations, offsets or other techniques may be performed in conjunction with the generation of predictive data. So-called SKIP modes and DIRECT modes may also be supported, which inherit motion information associated with a co-located block of another frame (or slice). SKIP mode blocks do not include any residual information, while DIRECT mode blocks include residual information. MERGE modes may also be supported, which may inherit motion information from a neighboring video block.

In addition, modes 35 may include inter coding modes, which define predictive data based on data within the same video frame (or slice) as that being coded. Intra coding modes may include directional modes that define predictive data based on data in a particular direction within the same frame, as well as DC and/or planar modes that define predictive data based on the average or weighted average of neighboring data. Prediction encoding unit 32 may select the mode for a given block based on some criteria, such as based on an rate-distortion analysis or some characteristics of the block, such as the block size, texture or other characteristics.

In accordance with this disclosure, prediction encoding unit 32 supports a bi-predictive inter mode 35X. With the described bi-predictive inter mode 35X, a video block being coded is bi-predicted based on predictive data associated with two different predictive video blocks. The two predictive video blocks may be averaged, or combined in another manner, such as via some weighted summation of the different pixel values. The two predictive video blocks may be identified by two different motion vectors, which are themselves predicted based on MVPs. Thus, with the bi-predictive inter mode 35X, prediction encoding unit 32 may generate an index to identify each of the MVPs and may generate MVDs that represent the difference between the motion vectors being coded and the corresponding MVPs used to code the motion vectors. The bi-predictive inter mode 35X may actually correspond to one of many bi-predictive inter modes, which may be defined differently for different block sizes or different weighting allocations for the two predictive blocks identified by the two motion vectors. In other words, although FIG. 3 shows one bi-predictive inter mode 35X, many may be supported, and some or all of such modes may use the techniques of this disclosure.

Moreover, in accordance with this disclosure, the MVP candidates may be expanded for at least one of the two motion vectors coded in the bi-predictive inter mode 35X. For example, a first one of the motion vectors may be coded based on MVP candidates defined by the motion vectors of one or more neighboring video blocks. However, once the first one of the motion vectors has been coded, that motion vector itself may be used to define yet another MVP candidate for coding the second one of the motion vectors of the current video block in the bi-predictive inter mode 35X. In this way, the number of MVP candidates used for coding the second motion vector is expanded, possibly resulting in improved video compression. The new MVP candidate for coding the second motion vector may comprise the first motion vector, or possibly a scaled version of the first motion vector. Scaling may be performed if the two motion vectors do not point to the same list of predictive video data. Scaling may extend the length of the MVP relative to the first motion vector, and/or may extend the motion vector in a different direction (e.g., a forward direction instead of reverse direction). Predictive blocks associated with the bi-predictive inter mode may be combined into one bi-predictive block (possibly using weighting factors), and the bi-predictive block may be subtracted from the current block being coded (via summer 48) to define residual data associated with the block coded in the bi-predictive inter mode.

In applying bi-predictive inter mode 35X, prediction encoding unit 32 may determine a first motion vector to be used to code a current video block in the bi-predictive inter mode, identify a first MVP based on a first set of motion vectors associated with one or more neighboring video blocks, generate a first index that identifies the first MVP, and generate a first MVD based on the first motion vector and the first MVP. In addition, prediction encoding unit 32 may determine the second motion vector to be used to code the current video block in the bi-predictive inter mode, identify a second MVP based on a second set of motion vectors, wherein the second set of motion vectors include motion vectors associated with one or more of the neighboring video blocks and a candidate based on the first motion vector, generate a second index that identifies the second MVP, and generate a second MVD based on the second motion vector and the second MVP. Prediction encoding unit 32 may output the first index, the first MVD, the second index and the second MVD as part of an encoded bitstream for the current video block. A number of examples are described below to demonstrate how a candidate based on the first motion vector can be defined for purposes of MVP coding of the second motion vector.

In the case of HEVC, the current video block being coded may comprise a so-called CU defined relative to an LCU according to a quadtree partitioning scheme. In this case, quadtree partition unit 31 may generate LCU syntax data that defines the quadtree partitioning scheme, and prediction encoding unit 32 may generate mode information for the CU that defines the bi-predictive inter mode, wherein the one or more syntax elements (which the MVPs and MVDs) are included in the mode information for the CU. The described bi-predictive inter mode may increase the number of MVP candidates that can be used in the context of coding one of the two bi-predictive motion vectors.

Generally, during the encoding process, video encoder 50 receives input video data. Prediction encoding unit 32 performs predictive coding techniques on video blocks (e.g. CUs and PUs) Quadtree partition unit 31 may break an LCU into smaller CU's and PU's according to HEVC partitioning explained above with reference to FIG. 2. For inter coding, prediction encoding unit 32 compares CUs or PUs to various predictive candidates in one or more video reference frames or slices (e.g., one or more "list" of reference data) in order to define a predictive block. For intra coding, prediction encoding unit 32 generates a predictive block based on neighboring data within the same video frame or slice. Prediction encoding unit 32 outputs the prediction block and adder 48 subtracts the prediction block from the CU or PU being coded in order to generate a residual block. Again, at least some video blocks may be coded using the bi-predictive inter mode described herein.

Figure 4:
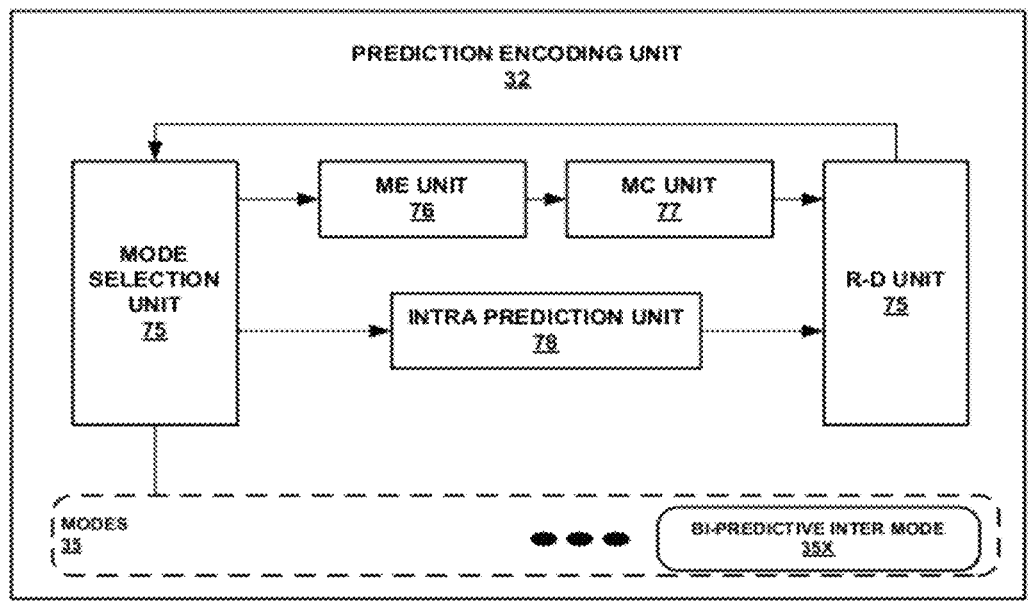
FIG. 4 is a block diagram illustrating an exemplary prediction unit of an encoder, consistent with one or more examples of this disclosure

FIG. 4 illustrates one example of prediction encoding unit 32 of video encoder 50 in greater detail. Prediction encoding unit 32 may include a mode selection unit 75 that selects the desired mode from modes 35, which include bi-predictive inter mode 35X as a possibility. For inter coding, prediction encoding unit 32 may comprise motion estimation (ME) unit 76 and motion compensation (MC) unit 77 that identify one or more motion vectors that points to predictive data, and generates the prediction block based on the one or more motion vectors. Typically, motion estimation is considered the process of generating the one or more motion vectors, which estimate motion. For example, the one or more motion vectors may indicate the displacement of one or more predictive blocks within a predictive frame relative to the current block being coded within the current frame. In the case of a bi-predictive inter mode 35X, two motion vectors are combined to create a bi-directional prediction. The techniques of this disclosure specifically concern the manner in which the motion vectors themselves are coded, e.g., allowing one of the motion vectors to be used to define a MVP for predicting the other one of the motion vectors. Again, the bi-predictive inter mode 35X may actually correspond to one of many bi-predictive inter modes, which may be defined differently for different block sizes or different weighting allocations for the two predictive blocks identified by the two motion vectors. In other words, although FIG. 4 shows one bi-predictive inter mode 35X, many may be supported, and some or all of such modes may use the techniques of this disclosure.

Motion compensation is typically considered the process of fetching or generating the predictive block (or blocks) based on the one or more motion vectors determined by motion estimation. In some cases, motion compensation for inter-coding may include interpolations to sub-pixel resolution, which permits the motion estimation process to estimate motion of video blocks to such sub-pixel resolution. Weighted combinations of two blocks (in the case of bi-prediction) may also be used.

For intra coding, prediction encoding unit 32 may comprise intra prediction unit 78. In this case, predictive data may be generated based on data within the current video block (e.g., adjacent to the video block being coded). Again, intra coding modes may include directional modes that define predictive data based on data in a particular direction within the same frame, as well as DC and/or planar modes that define predictive data based on the average or weighted average of neighboring data.

Rate-distortion (R-D) unit 79 may compare coding results of video blocks (e.g., CUs or PUs) in different modes. In addition R-D unit 79 may allow for other types of parameter adjustments, such as adjustments to interpolations, offsets, quantization parameters, or other factors that can affect the coding rate. Mode selection unit 75 can analyze the coding results in terms of coding rate (i.e., coding bits required for the block) and distortion (e.g., representing the video quality of the coded block relative to the original block) in order to make mode selections for video blocks. In this way, R-D unit 79 provides analysis of the results of different modes to allow mode selection unit 75 to select the desired mode for different video blocks. Consistent with this disclosure, the bi-predictive inter mode 35X may be selected when R-D unit 79 identifies it as the desired mode for a given video block, e.g., due to coding gains or coding efficiency.

Referring again to FIG. 3, after prediction encoding unit 32 outputs the prediction block, and after adder 48 subtracts the prediction block from the video block being coded in order to generate a residual block of residual pixel values, transform unit 38 applies a transform to the residual block. The transform may comprise a discrete cosine transform (DCT) or a conceptually similar transform such as that defined by the ITU H.264 standard or the HEVC standard. So-called "butterfly" structures may be defined to perform the transforms, or matrix-based multiplication could also be used. In some examples, consistent with the HEVC standard, the size of the transform may vary for different CUs, e.g., depending on the level of partitioning that occurs with respect to a given LCU. Transform units (TUs) may be defined in order to set the transform size applied by transform unit 38. Wavelet transforms, integer transforms, sub-band transforms or other types of transforms could also be used. In any case, transform unit applies the transform to the residual block, producing a block of residual transform coefficients. The transform, in general, may convert the residual information from a pixel domain to a frequency domain.

Quantization unit 40 then quantizes the residual transform coefficients to further reduce bit rate. Quantization unit 40, for example, may limit the number of bits used to code each of the coefficients. In particular, quantization unit 40 may apply the delta QP defined for the LCU so as to define the level of quantization to apply (such as by combining the delta QP with the QP of the previous LCU or some other known QP). After quantization is performed on residual samples, entropy coding unit 46 may scan and entropy encode the data.

CAVLC is one type of entropy coding technique supported by the ITU H.264 standard and the emerging HEVC standard, which may be applied on a vectorized basis by entropy coding unit 46. CAVLC uses variable length coding (VLC) tables in a manner that effectively compresses serialized "runs" of coefficients and/or syntax elements. CABAC is another type of entropy coding technique supported by the ITU H.264 standard or the HEVC standard, which may be applied on a vectorized basis by entropy coding unit 46. CABAC may involve several stages, including binarization, context model selection, and binary arithmetic coding. In this case, entropy coding unit 46 codes coefficients and syntax elements according to CABAC. Many other types of entropy coding techniques also exist, and new entropy coding techniques will likely emerge in the future. This disclosure is not limited to any specific entropy coding technique.

Following the entropy coding by entropy encoding unit 46, the encoded video may be transmitted to another device or archived for later transmission or retrieval. The encoded video may comprise the entropy coded vectors and various syntax information (including the syntax information that defines the bi-predictive inter mode, the MVP indexes and the MVDs). Such information can be used by the decoder to properly configure the decoding process. Inverse quantization unit 42 and inverse transform unit 44 apply inverse quantization and inverse transform, respectively, to reconstruct the residual block in the pixel domain. Summer 51 adds the reconstructed residual block to the prediction block produced by prediction encoding unit 32 to produce a reconstructed video block for storage in memory 34. Prior to such storage, however, filter unit 47 may apply filtering to the video block to improve video quality. The filtering applied by filter unit 47 may reduce artifacts and smooth pixel boundaries. Moreover, filtering may improve compression by generating predictive video blocks that comprise close matches to video blocks being coded.

According to this disclosure, bi-predictive inter mode 35X is supported, wherein at least one of the motion vectors is predicted based on an MVP that is defined by the other of the motion vectors. In this way, the MVP candidates may be expanded for at least one of the two motion vectors coded in the bi-predictive inter mode 35X. For example, a first one of the motion vectors may be coded based on MVP candidates defined by the motion vectors of one or more neighboring video blocks. However, once the first one of the motion vectors has been coded, that motion vector itself may be used to define yet another MVP candidate for coding the second one of the motion vectors of the current video block in the bi-predictive inter mode 35X. In this way, the number of MVP candidates used for coding the second motion vector is expanded, possibly resulting in improved video compression. The new MVP candidate for coding the second motion vector may comprise the first motion vector, or possibly a scaled version of the first motion vector. Addition details of different types of scaling are discussed in greater detail below. In any case, R-D unit 79 (FIG. 4) may identify bi-predictive inter 35X as the most desirable coding mode due to coding gains achieved by this mode relative to other modes. In such cases, mode selection unit 75 may select bi-predictive inter mode 35X for coding a given video block.

Figure 5:
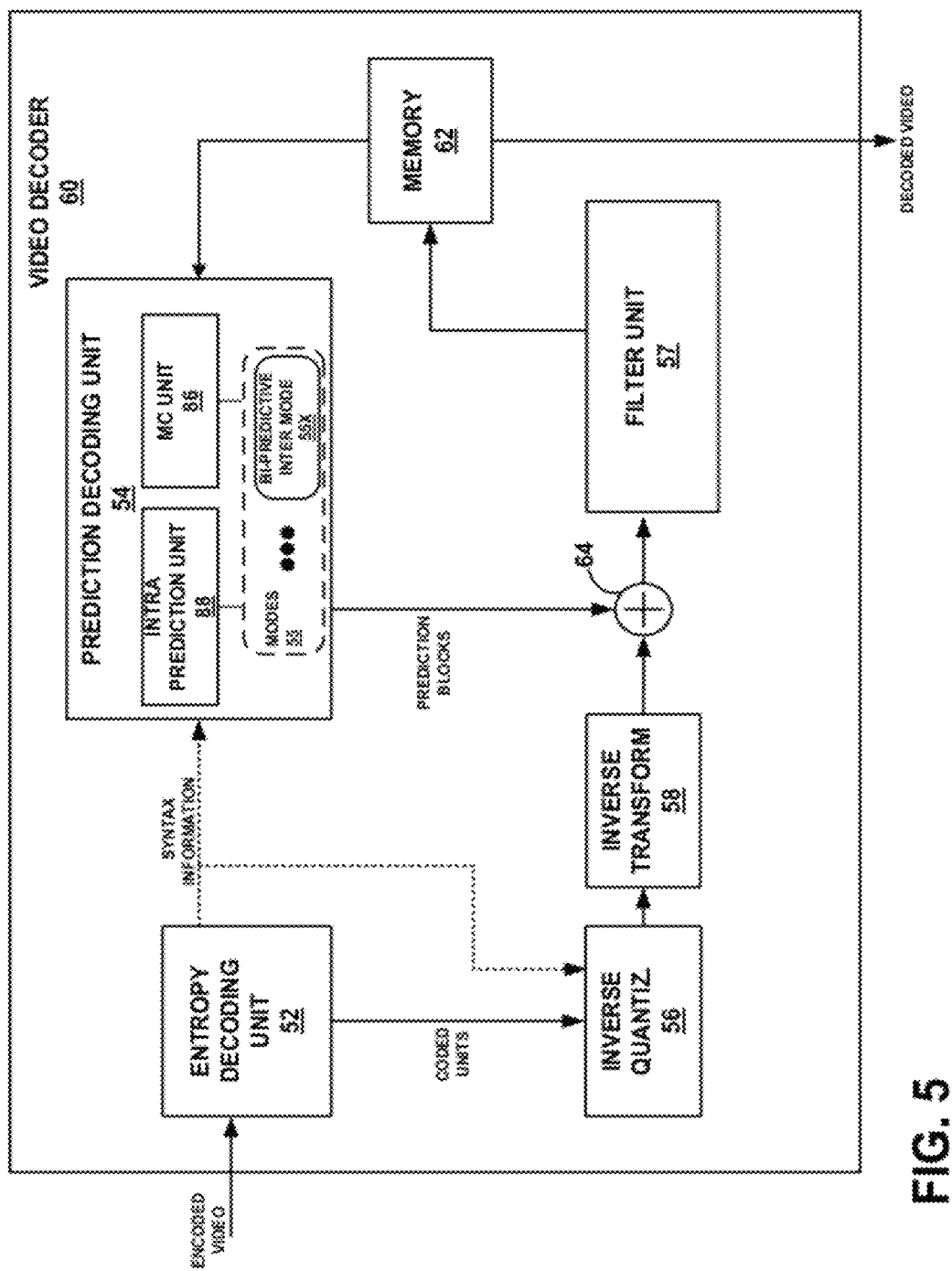
FIG. 5 is a block diagram illustrating a video decoder that may implement techniques of this disclosure.

FIG. 5 is a block diagram illustrating an example of a video decoder 60, which decodes a video sequence that is encoded in the manner described herein. The techniques of this disclosure may be performed by video decoder 60 in some examples. In particular, video decoder 60 may decode video data in which AMVP is used to code a first motion vector and a second motion vector associated with a current video block that is coded in a bi-predictive inter mode. In this case, video decoder 60 may receive a first MVD associated with the first motion vector, receive a first index that identifies a first MVP, generate the first motion vector based on the first MVD and the first MVP, receive a second MVD associated with the second motion vector, receive a second index that identifies a second MVP, wherein the second MVP is defined based on the first motion vector, and generate the second motion vector based on the second MVD and the second MVP A video sequence received at video decoder 60 may comprise an encoded set of image fames, a set of frame slices, a commonly coded group of pictures (GOPs), or a wide variety of units of video information that include encoded LCUs (or other video blocks) and syntax information to define how to decode such LCUs. The process of decoding the LCUs may include decoding an indication of the coding mode, which may be the bi-predictive inter mode described herein.

Video decoder 60 includes an entropy decoding unit 52, which performs the reciprocal decoding function of the encoding performed by entropy encoding unit 46 of FIG. 2. In particular, entropy decoding unit 52 may perform CAVLC or CABAC decoding, or any other type of entropy decoding used by video encoder 50. Entropy decoding unit 52 may receive a bitstream that includes entropy coded data. Entropy decoding unit 52 parses the data to generate various the syntax elements including the indexes, and MVDs described in this disclosure.

Video decoder 60 also includes a prediction decoding unit 54, an inverse quantization unit 56, an inverse transform unit 58, a memory 62, and a summer 64. In particular, like video encoder 50, video decoder 60 includes a prediction decoding unit 54 and a filter unit 57. Prediction decoding unit 54 of video decoder 60 may include motion compensation unit 86, which decodes inter coded blocks and possibly includes one or more interpolation filters for sub-pixel interpolation in the motion compensation process. Prediction decoding unit 54 may also include an intra prediction unit for decoding intra modes. Prediction decoding unit 54 may support a plurality of modes 35 including bi-predictive inter mode 55X. Filter unit 57 may filter the output of summer 64, and may receive entropy decoded filter information so as to define the filter coefficients applied in the loop filtering. The bi-predictive inter mode 55X may actually correspond to one of many bi-predictive inter modes supported by prediction decoding unit 54. Different bi-predictive inter modes may be defined differently, for example, for different block sizes or different weighting allocations for the two predictive blocks identified by the two motion vectors. Thus, although FIG. 5 shows one bi-predictive inter mode 55X, many may be supported, and some or all of such modes may use the techniques of this disclosure.

Upon receiving encoded video data, entropy decoding unit 52 performs reciprocal decoding to the encoding performed by entropy encoding unit 46 (of encoder 50 in FIG. 4). At the decoder, entropy decoding unit 52 parses the bitstream to determine LCU's and the corresponding partitioning associated with the LCU's. In some examples, an LCU or the CUs of the LCU may define coding modes that were used, and these coding modes may include the bi-predictive inter mode. Accordingly, entropy decoding unit 52 may forward the syntax information to prediction unit that identifies the bi-predictive inter mode. In this case, the syntax information may include one or more syntax elements that identify the MVPs and MVDs. MC unit 86 of prediction decoding unit 54 may use the MVPs and MVD to reconstruct a predictive block. That is, MC unit 86 may reconstruct the two motion vectors based on MVPs and MVDs, and then fetch predictive data identified by the motion vectors. The fetched data may be combined by MC unit 86 (possibly in some weighted fashion)

to define a predictive video block for decoding the current video block in bi-predictive inter mode.

As explained herein AMVP can be used to build a motion vector candidate set by including several neighboring blocks in spatial and temporal directions as candidates for MVP. The encoder can select the most accurate predictor from the candidate set based on analysis of encoding rate and distortion (e.g., using so-called rate-distortion cost analysis). A motion vector predictor index (mvp_idx) can be transmitted to a decoder to inform the decoder where to locate the MVP. The MVD is also communicated. The decoder can combine the MVD with the MVP (defined by the motion vector predictor index) so as to reconstruct the motion vector. The decoder (like the encoder) can define the set of candidate MVPs to which the index is applied based on various criteria. The encoder and the decoder may be programmed to know how indexes map to MVP candidates, and these mappings may even adapt over time, e.g., based on statistics of previously coded video blocks that use AMVP.

FIG. 6 is a conceptual diagram showing one example of the possible neighboring blocks (neighbors X, Y and Z) that could be used to define MVPs. The candidate MVPs may also be defined from blocks located in different (already encoded/decoded) frames, e.g., motion vectors of a co-located block to block E from one or more previously coded frames. In AMVP mode, the candidate MVPs can be defined based on the motion vectors of neighboring blocks.

Figure 7:
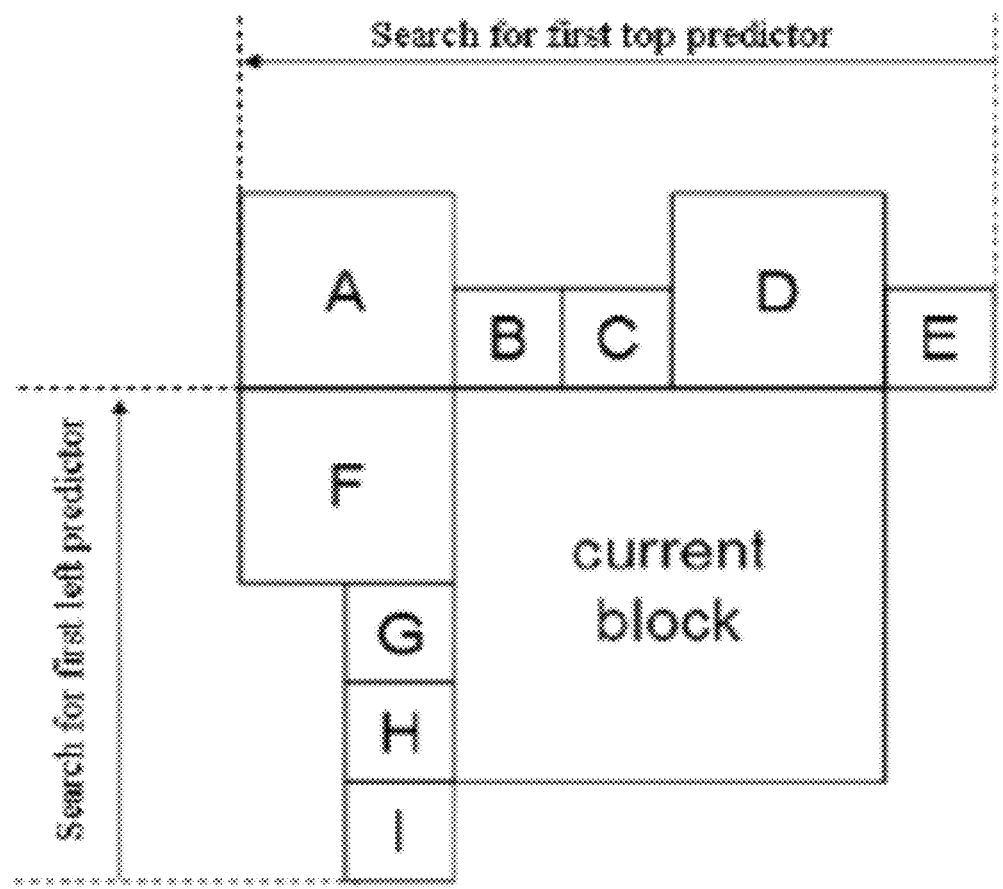
FIG. 7 is another conceptual diagram illustrating the location of neighboring video blocks relative to current video block such that the current video block may use information of one or more different neighboring video blocks in a bi-predictive inter mode, consistent with this disclosure.

FIG. 7 is another conceptual diagram showing possible blocks (A, B, C, D and E) that could be used to define MVPs for a so-called "top predictor," and possible blocks (I, H, G and F) that could be used to define MVPs for a so-called "left predictor." With unidirectional prediction, the entire candidate set of MVPs associated with AMVP may include three candidates. The first potential candidate MVP may comprise a top predictor, and may comprise the first identified motion vector from A, B, C, D or E that has the same reference list and same reference index as the current motion vector being coded (thus pointing to the same reference frame). The second potential candidate MVP is a left predictor, and comprises the first motion vector associated with blocks F, G, H or I that has the same reference list and same reference index as the current motion vector being coded. The third potential candidate MVP is the motion vector associated with a co-located block to that of the current video block, wherein the co-located block is located in another (e.g., previously coded) frame. Like the other candidates, the candidate associated with the co-located block may need to define the same reference list and same reference index as the current motion vector being coded, in order to be a valid candidate.

If none of the potential MVP candidates point to the same video frame as the current motion vector that is being coded (i.e., if none of the potential MVP candidates have same reference list and same reference index as the current motion vector being coded), then the MVP may be set to some default value, such as zero. In this case (e.g., if the default value for the MVP were set to zero), the MVD would correspond to the motion vector, and the prediction techniques applied to the motion vector would not result in any data compression.

In some cases, two different motion vectors may be used to predict the data associated with one video block. This is commonly referred to as bi-directional prediction or bi-prediction. Although the phrase bi-directional prediction is sometimes used synonymously with bi-prediction, the phrase "bi-directional prediction" is often a misnomer insofar as the two motion vectors are typically not limited to any directional requirements. In other words, with bi-prediction (an bi-directional prediction) the two motion vectors may be allowed point to data associated with one or more previous video frames and/or one or more subsequent video frames.

In H.264/AVC, the predictive frames are organized into two reference lists. For example, list 0 may comprise a forward list of predictive video data and list 1 may comprises a backwards list of predictive data. Again, however, list 0 and list 1 may, in some cases, point to two different forward lists, two different backwards lists, or possibly even two identical lists of predictive data.

Figure 8:
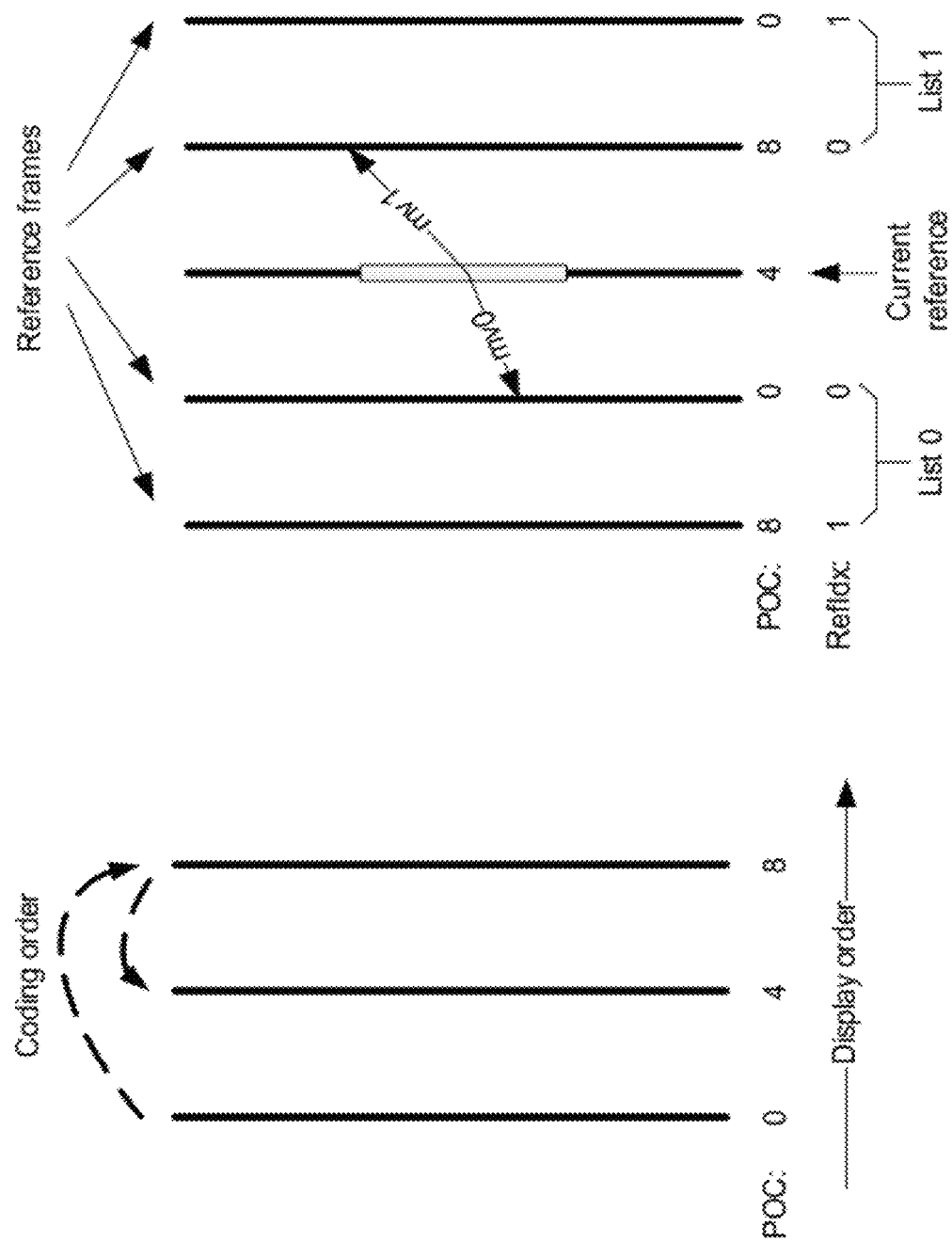
FIGS. 8-12 are conceptual diagrams illustrating how one motion vector of a bi-predicted video block can be used to define a candidate MVP for another motion vector of the bi-predicted video block.

FIG. 8 is a conceptual diagram illustrating how one motion vector of a bi-predicted video block can be used to define a candidate MVP for another motion vector of the bi-predicted video block. As shown in the left portion of FIG. 8, three successive video frames are labeled as frames 0, 4, and 8. Thus, the display order of such frames shown in FIG. 8 is 0→4→8. This means that frame 0 is previous to frame 4 in the display order, and frame 8 is subsequent to frame 4 in the display order. However, during encoding, the encoding order can be different than the display order. For example, the encoded order of the frames shown in FIG. 8 could be 0→8→4 to achieve better coding performance.

The right portion of FIG. 8 conceptually illustrates the encoding of frame 4, which may be the middle frame in the display order and the last frame in the encoding order. In this case, there are two reference frames, i.e., frame 0 and frame 8. The two reference frames (or portions thereof) may be organized into two reference lists (list L0 and list L1), but the data may be stored with different reference indexes (Refidx), as shown in FIG. 8.

A current video block in frame 4 may be predicted from data from list L0, predicted from data from list L1, or predicted from a combination of data in both lists. If the prediction is a combination of predictions from two different reference lists, the mode may be referred to as a bi-predictive inter mode. In the bi-prediction inter mode, two motion vectors are sent to decoder to indicate the corresponding two predictions from the two different lists. Moreover, if AMVP is used to encode the motion vectors, an MVP can be selected among candidate MVPs for each of the two motion vectors, and the indexes of MVPs can be encoded as part of an encoded bitstream.

The techniques of this disclosure describe the use of one motion vector of a bi-predictive video block to define an MVP for the other motion vector of the bi-predictive video block. For example, referring to FIG. 8, a scaled version of mv0 may be used to predict mv1. In this example, the scaling can change the orientation and direction of MVP so as to point to reference frame 8 rather than reference frame 0 (e.g., in the case of FIG. 8 where mv1 points to reference frame 0 but mv2 points to reference frame 8). The scaling may be dependent on the picture order count (POC) number, the reference index, the local picture structures of the prediction, or mv0 itself. In this way, improved data compression may be achieved in bi-directional prediction mode.

The techniques of this disclosure build upon an AMVP framework with regard determining an MVP for AMVP. However, this disclosure describes techniques for expanding the list of MVP candidates for AMVP. Doing so can improve compression of motion vectors.

More specifically, this disclosure describes techniques in which a scaled version of one motion vector of a bi-predicted video block can be used an MVP for predicting another motion vector of the bi-predicted video block. For example, a scaled version of a first motion vector of the bi-predicted video block can be used as the MVP for the second motion vector of bi-prediction.

The bi-predicted video block may comprise a so-called B-video block consistent with the ITU-H.264 standard, or another emerging standard such as high efficiency video coding (HEVC). Alternatively or additionally, the bi-predicted video block may comprise a so-called GPB block, which is type of block proposed to combine aspects of B-video blocks and P-video blocks. GPB blocks are predicted based on two lists of predictive data, but the lists may be identical.

Figure 9:
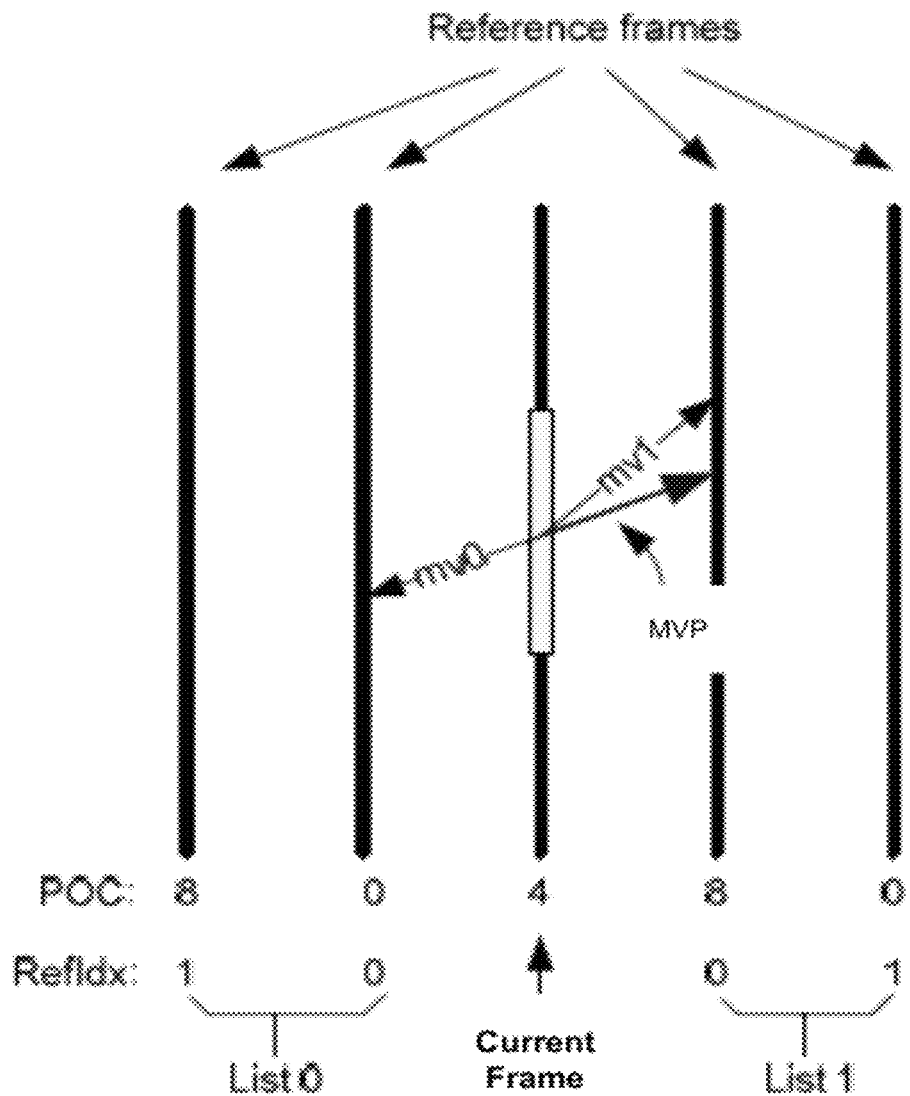

FIG. 9 is another conceptual diagram illustrating how one motion vector of a bi-predicted video block can be used to define a candidate MVP for another motion vector of the bi-predicted video block. As shown in FIG. 9, two different motion vectors (e.g. one associated with list 0 and one associated with list 1) are denoted by mv0 and mv1 respectively. The mv0 motion vector may be encoded or decoded first, and may be predicted via normal AMVP techniques. Next, mv1 can be encoded or decoded (that is following the encoding or decoding of mv0).

In the example of FIG. 9, mv0 points to data associated with a previous frame (i.e., that identified by picture order count (POC) 0), while mv1 points to data associated with a subsequent frame (i.e., that identified by POC 8). In particular, mv0 may identify data in refidx 0 of list 0, which refers to data of the previous frame at POC 0, while mv1 may identify data in refidx 0 of list 1, which refers to data of the subsequent frame at POC 0. In this case, the first motion vector points to data associated with a previous frame and the second motion vector points to data associated with a subsequent frame. Thus, the second MVP (that used to predict the second motion vector) may comprise a scaled version of the first motion vector, wherein a temporal distance of the previous frame relative to a current frame is the same as a temporal distance of the subsequent frame relative to the current frame.

Similar to the example of FIG. 9, it is also possible that the first motion vector could point to data associated with a subsequent frame and the second motion vector could point to data associated with a previous frame. In this case, the second MVP (that used to predict the second motion vector) may comprise a scaled version of the first motion vector, wherein a temporal distance of the subsequent frame relative to a current frame is the same as a temporal distance of the previous frame relative to the current frame.

Figure 10:
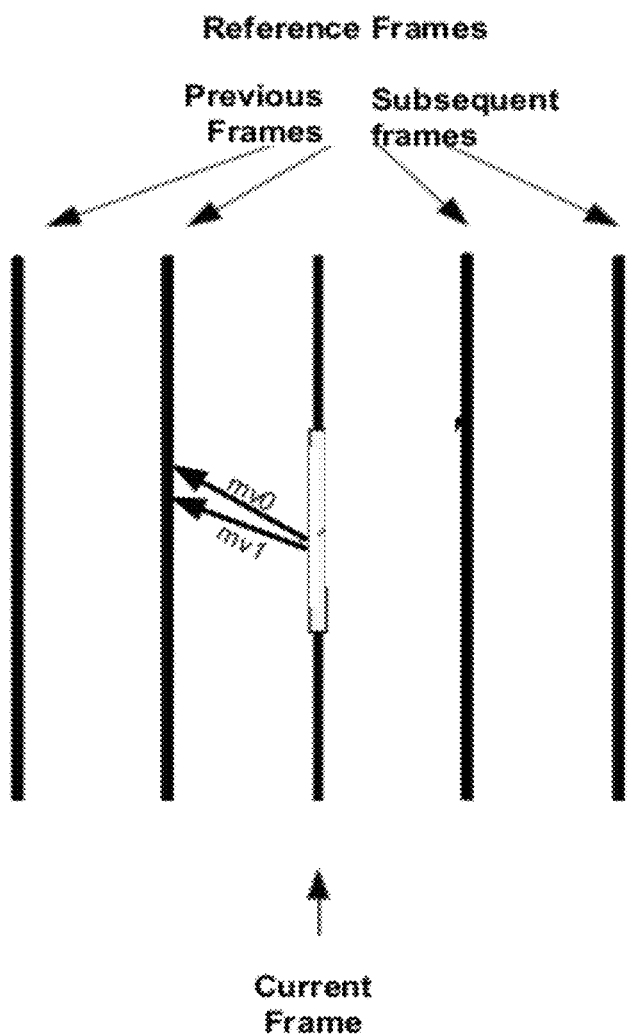

FIG. 10 is another conceptual diagram illustrating how one motion vector of a bi-predicted video block can be used to define a candidate MVP for another motion vector of the bi-predicted video block. In this example, a first motion vector (mv0) and a second motion vector (mv1) point to data associated with a same predictive frame (i.e., that of a previous frame). In this case, the second MVP (that used to predict the second motion vector) may comprise the first motion vector. A similar technique could also apply when mv0 and mv1 both point to data associated with a same predictive frame that is subsequent to the current frame in display order.

Figure 11:
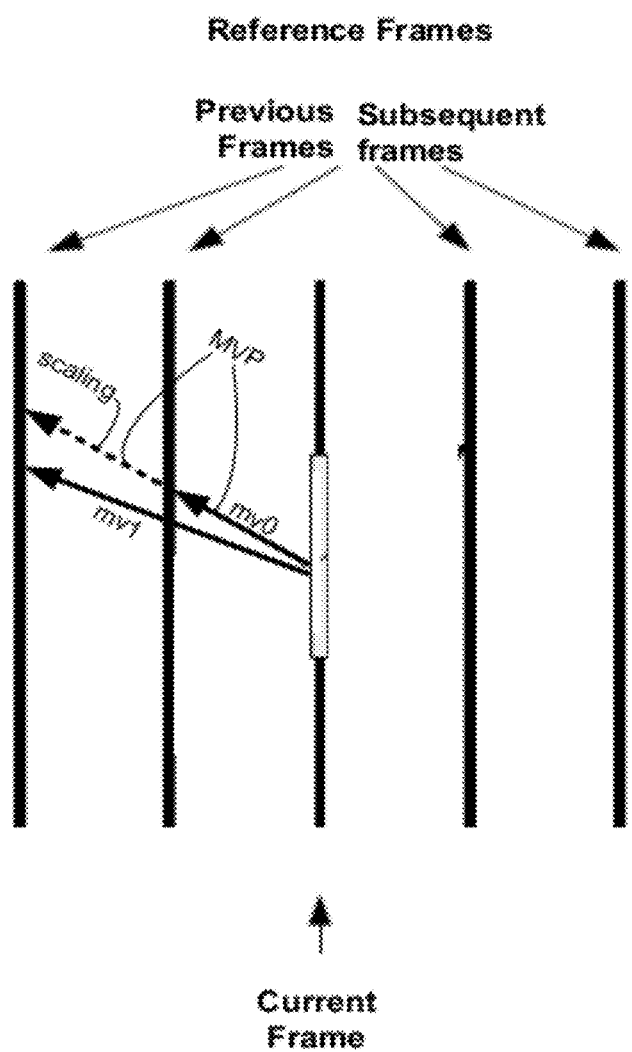

FIG. 11 is another conceptual diagram illustrating how one motion vector of a bi-predicted video block can be used to define a candidate MVP for another motion vector of the bi-predicted video block. In this example, a first motion vector (mv0) points to data associated with a previous frame and a second motion vector (mv1) points to data associated with another previous frame. In this case, the second MVP (that used to predict the second motion vector) may comprise a scaled version of the first motion vector in which the scaling extends the MVP relative to the second motion vector direction of the previous frames relative to the current frame (as illustrated by "scaling" in FIG. 11. A similar technique could also apply when mv0 and mv1 both point to data associated with a same predictive frame that is subsequent to the current frame in display order.

Figure 12:
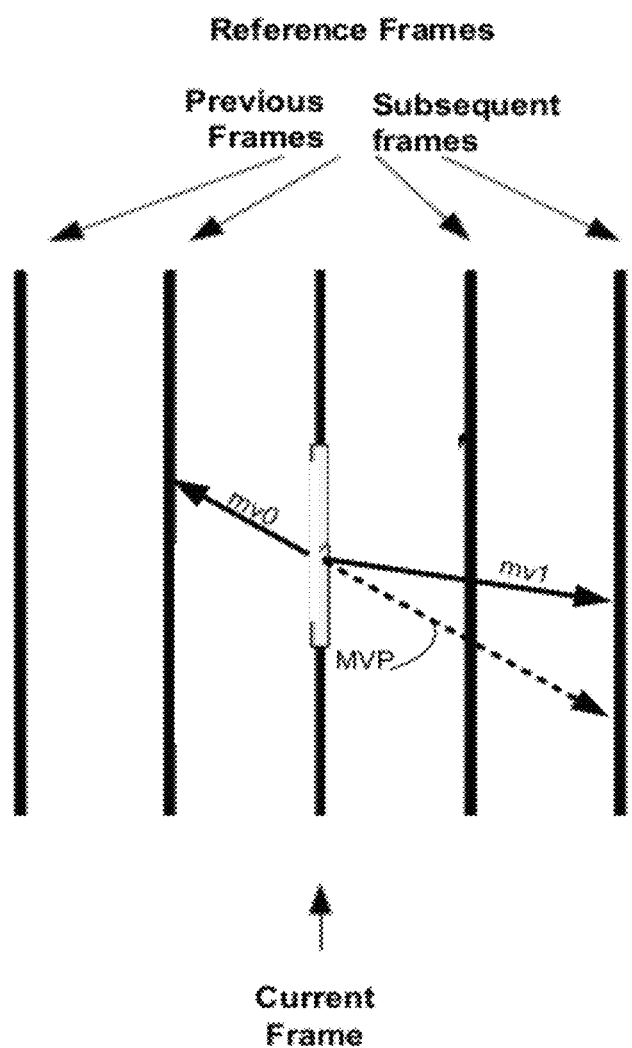

FIG. 12 is another conceptual diagram illustrating how one motion vector of a bi-predicted video block can be used to define a candidate MVP for another motion vector of the bi-predicted video block. In this example, a first motion vector (mv0) points to data associated with a previous frame and a second motion vector (mv1) points to data associated with a subsequent frame. However, in this case, a temporal distance of the previous frame relative to a current frame is different than a temporal distance of the subsequent frame relative to the current frame. That is, the subsequent frame is a further temporal distance from the current frame than the previous frame is to the current frame. In this case, the second MVP (that used to predict the second motion vector) may comprise a scaled version of the first motion vector in which the scaling both changes the direction of the second MVP relative to the first motion vector and also extends the distance of the second MVP relative to the first motion vector. A similar technique could also apply when the first motion vector (mv0) points to data associated with a subsequent frame, the second motion vector (mv1) points to data associated with a previous frame, and a temporal distance of the subsequent frame relative to a current frame is different than a temporal distance of the previous frame relative to the current frame.

Referring again to FIGS. 8 and 9, assume that the current frame defines a POC=4 (that is, the current frame POC number is 4). In this case, mv0 may be (5, 2), and refPOC_L0 may be 0 (meaning that the reference frame POC number of mv0 is 0, and the list 0 prediction comes from frame 0). Also, in this case, mv1 may be (−8, −1), and refPOC_L1 may be 8 (meaning that the reference frame POC number of mv1 is 8 and the list 1 prediction comes from frame 8)

Assume that MVP_mv1={(0, 0), (−1, −6)} (i.e., there are two predictor candidates of mv1). In this case, once mv0 is encoded or decoded, it can be scaled according the distance of POC number so as to define an MVP for predicting mv1. Accordingly, the scaled version of mv0 used as an MVP candidate for mv1 can be represented as:

$$\text{Scaled\_}mv0=(\text{RefPoc\_}L1-\text{CurPoc})*mv0/(\text{RefPoc\_}L0-\text{CurPoc})=(8-4)*mv0/(0-4)=-mv0=(-5,-2)$$

Then MVP_mv1 can be updated by adding the scaled_mv0 as an MVP candidate, which expands the list of possible MVP candidates as follows:

$$\text{MVP\_}mv1=\{(0,0),(-1,-6),(-5,-2)\}.$$

Accordingly, mv1 can be encoded based on the new candidate list MVP_mv1. In this case, if the encoder compares the MVD (mv1−MVP_mv1(*i*), i=0, 1, 2) of the three candidates, the MVD results may be represented as {(−8, −1), (−7, 5), (−3, 1)}. Thus, in this example, the added predictor (i.e., the scaled version of mv0 used to predict mv1) provides the smallest MVD, which can result in improved coding efficiency. Therefore, in the case where scaled_mv0 achieves the best compression relative to other possible MVP candidates, an index can be output as part of an encoded bitstream, so that the decoder can identify, generate and use scaled_mv0 to predict mv1.

Figure 13:
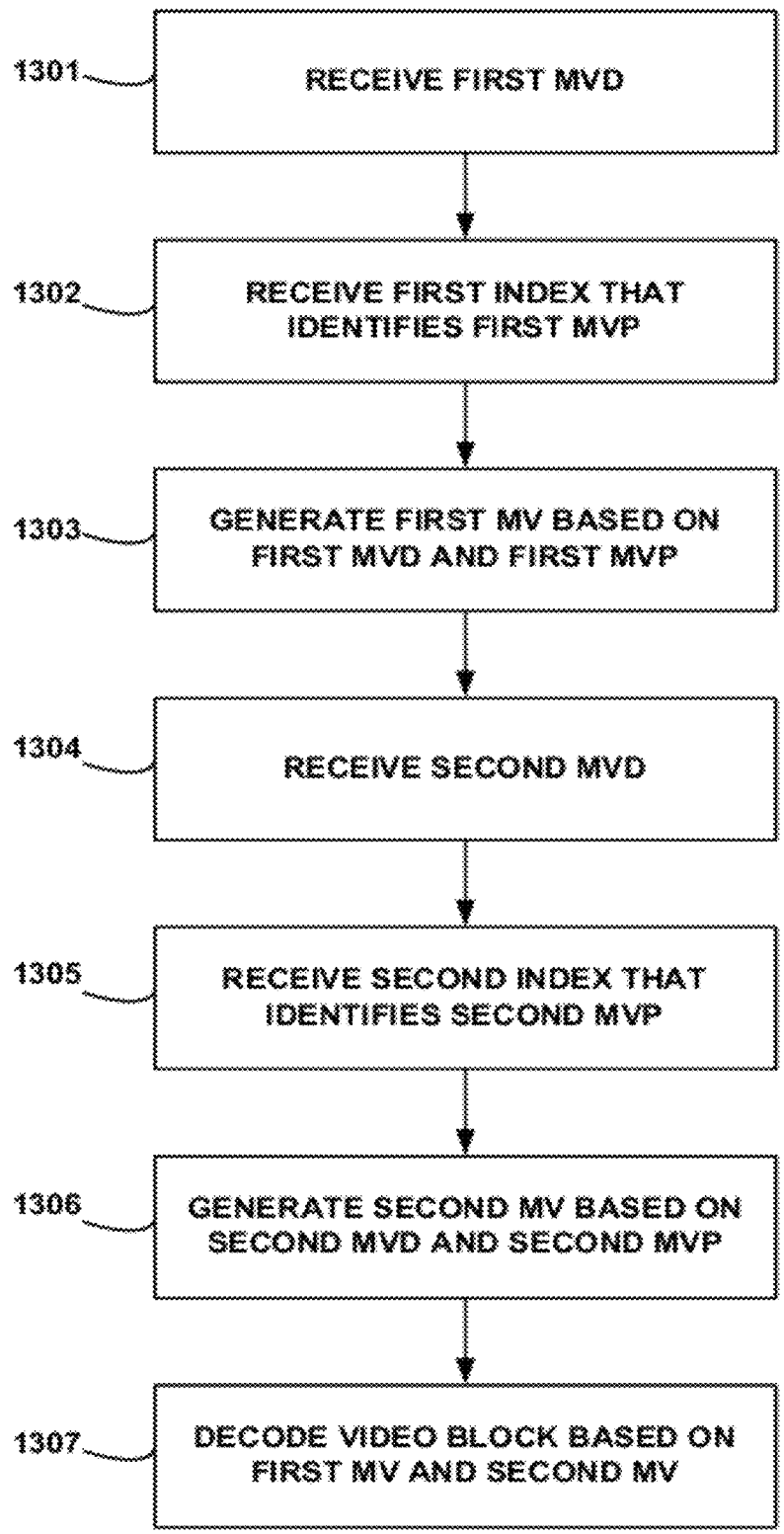
FIGS. 13 and 14 are flow diagrams illustrating techniques consistent with this disclosure.

FIG. 13 is a flow diagram illustrating a decoding technique consistent with this disclosure. FIG. 13 will be described from the perspective of video decoder 60 of FIG. 5, although other devices may perform similar techniques. As shown in FIG. 13, MC unit 86 of prediction decoding unit 54 receives a first MVD (1301) and receives a first index that identifies a first MVP (1302). MC unit 86 generates a first motion vector (MV) based on the first MVD and the first MVP (1303). In addition MC unit 86 of prediction decoding unit 54 receives a second MVD (1304) and receives a second index that identifies a second MVP (1305). MC unit 86 then generates a second MV based on the first MVD and the first MVP (1306). The second MVP, which is identified by the second index, may be based on the first MV, as explained in this disclosure.

Video decoder 60 can then decode a current video block based on the first MV and the second MV (1307). In particular, MC unit 86 can generate predictive data based on the first MV and the second MV and combine this data (possibly I a weighted fashion) to form a prediction block. The prediction block is combined with a residual block by adder 64 and the result may be filtered by filter unit 57 to generate a reconstructed video block for storage in memory 62. The reconstructed video block may then be output to a rendering device for presentation as part of a decoded video frame of a video sequence.

Figure 14:
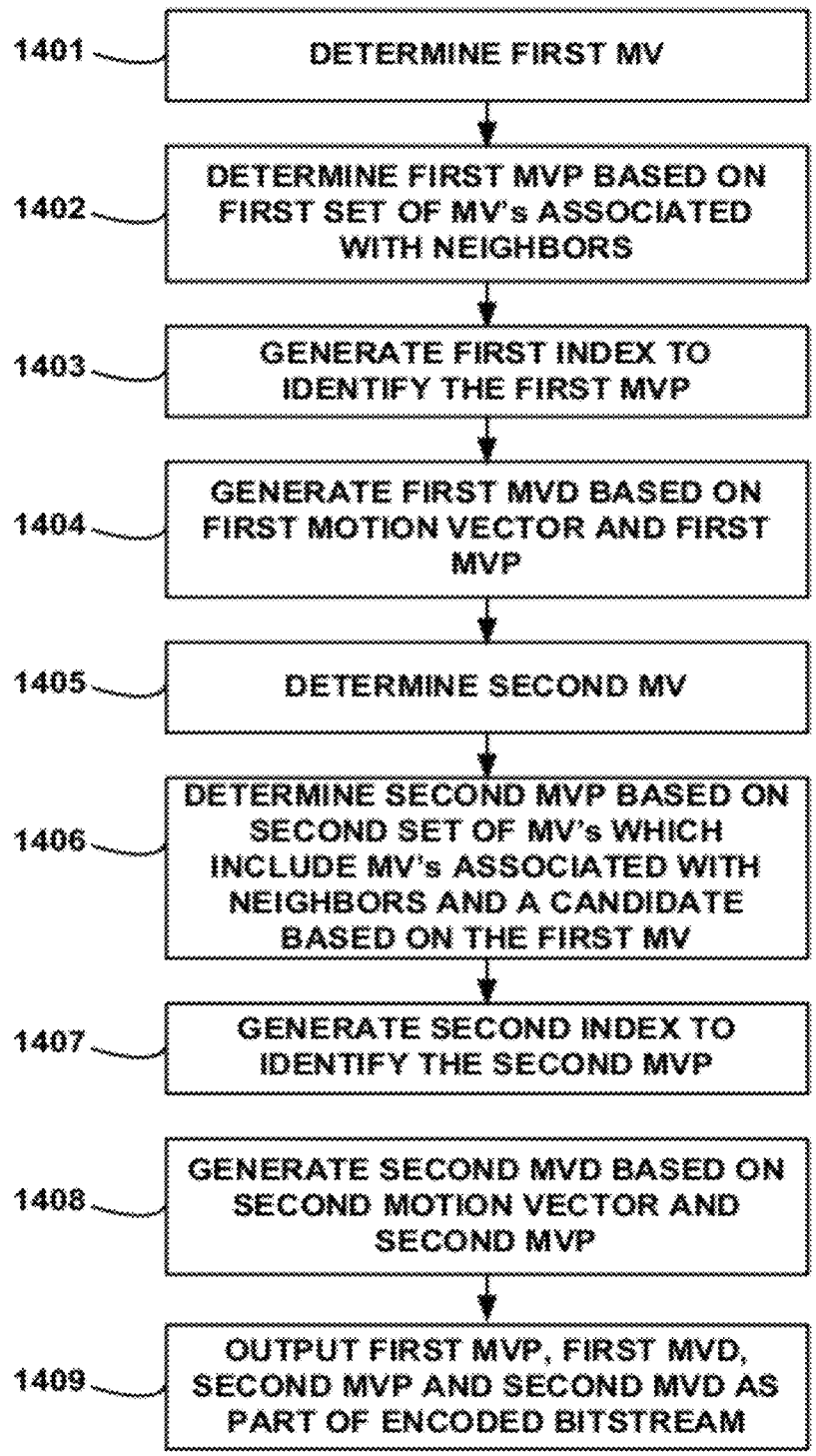

FIG. 14 is a flow diagram illustrating an encoding technique consistent with this disclosure. FIG. 14 will be described from the perspective of video encoder 50 of FIG. 3, although other devices may perform similar techniques. As shown in FIG. 14, prediction encoding unit 32 may determine a first MV (1401) and determine a first MVP based on a first set of MV's associated with neighbors (1402). In particular, the first MVP may be defined as the candidate in the first set of MV's that most closely approximates first MV. Prediction encoding unit 32 may generate a first index to identify the first MVP (1403), and may generate a first MVD based on the first MV and the first MVP (1404). In particular the first MVD may comprise the difference values (or deltas) between the first MV and the first MVP.

Next, prediction encoding unit 32 may determine a second MV (1405) and determine a second MVP based on a second set of MV's, wherein the second set of MV's include MV's associated with neighbors and a candidate based on the first MV (1406). As described herein, scaling may be used to define the candidate of the second set of MV's that is based on the first MV. The second MVP may be defined as the candidate in the second set of MV's that most closely approximates second MV. Prediction encoding unit 32 may generate a second index to identify the second MVP (1407), and may generate a second MVD based on the second MV and the second MVP (1408). In particular the second MVD may comprise the difference values (or deltas) between the second MV and the second MVP. Video encoder 50 may output the first index, the first MVD, the second index and the second MVP as part of an encoded bitstream. In particular, prediction unit 32 may output the first index, the first MVD, the second index and the second MVP to entropy encoding unit 46. Entropy encoding unit 46 may perform entropy coding on the first index, the first MVD, the second index and the second MVP (along with other syntax information from prediction encoding unit 32 and residual data from quantization unit 40) in order to generate an encoded bitstream, which can be output for storage or transmission to another device. In this manner, video encoder 50 outputs the first MVP, the first MVD, the second MVP and the second MVD as part of an encoded bitstream (1409).

The techniques of this disclosure may be realized in a wide variety of devices or apparatuses, including a wireless handset, and integrated circuit (IC) or a set of ICs (i.e., a chip set). Any components, modules or units have been described provided to emphasize functional aspects and does not necessarily require realization by different hardware units.

Accordingly, the techniques described herein may be implemented in hardware, software, firmware, or any combination thereof. Any features described as modules or components may be implemented together in an integrated logic device or separately as discrete but interoperable logic devices. If implemented in software, the techniques may be realized at least in part by a computer-readable medium comprising instructions that, when executed, performs one or more of the methods described above. The computer-readable data storage medium may form part of a computer program product, which may include packaging materials.

The computer-readable medium may comprise a tangible computer readable storage medium, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured for encoding and decoding, or incorporated in a combined video encoder-decoder (CODEC). Also, the techniques could be fully implemented in one or more circuits or logic elements.

Various aspects of the disclosure have been described. These and other aspects are within the scope of the following claims.

The invention claimed is:

1. A method of decoding video data in which adaptive motion vector prediction (AMVP) is used to code a first motion vector and a second motion vector associated with a current video block that is coded in a bi-predictive inter mode that is based on a first reference video block and a second reference video block, the method comprising:
   receiving a first motion vector difference (MVD) associated with the first motion vector;
   receiving a first index that identifies a first motion vector predictor (MVP), selected from a first set of motion vector predictors;
   generating the first motion vector based on the first MVD and the first MVP, the first motion vector a function of the current video block and the first reference video block;
   receiving a second MVD associated with the second motion vector;
   receiving a second index that identifies a second MVP, wherein the second MVP is selected from a second set of motion vector predictors, the second set of motion vector predictors including a candidate motion vector predictor that is a function of a scaled first motion vector found by scaling the first motion vector by a scale factor that is function of a temporal distance from the current video block to the second reference video block and a temporal distance from the current video block to the first reference video block; and generating the second motion vector based on the second MVD and the candidate motion vector predictor.

2. The method of claim 1, wherein the first motion vector and the second motion vector point to data associated with a same predictive frame, and the second MVP is the first motion vector.

3. The method of claim 1, wherein the first motion vector points to data associated with a previous frame and the second motion vector points to data associated with another previous frame, wherein the second MVP comprises a scaled version of the first motion vector.

4. The method of claim 1, wherein the first motion vector points to data associated with a subsequent frame and the second motion vector points to data associated with another subsequent frame, wherein the second MVP comprises a scaled version of the first motion vector.

5. The method of claim 1, wherein the first motion vector points to data associated with a previous frame and the second motion vector points to data associated with a subsequent frame, wherein the second MVP comprises a scaled version of the first motion vector, wherein a temporal distance of the previous frame relative to a current frame is the same as a temporal distance of the subsequent frame relative to the current frame.

6. The method of claim 1, wherein the first motion vector points to data associated with a subsequent frame and the second motion vector points to data associated with a previous frame, wherein the second MVP comprises a scaled version of the first motion vector, wherein a temporal distance of the subsequent frame relative to a current frame is the same as a temporal distance of the previous frame relative to the current frame.

7. The method of claim 1, wherein the first motion vector points to data associated with a previous frame and the second motion vector points to data associated with a subsequent frame, wherein the second MVP comprises a scaled version of the first motion vector, wherein a temporal distance of the previous frame relative to a current frame is different than a temporal distance of the subsequent frame relative to the current frame.

8. The method of claim 1, wherein the first motion vector points to data associated with a subsequent frame and the second motion vector points to data associated with a previous frame, wherein the second MVP comprises a scaled version of the first motion vector, wherein a temporal distance of the subsequent frame relative to a current frame is different than a temporal distance of the previous frame relative to the current frame.

9. The method of claim 1, wherein the current video block comprises a coding unit (CU) defined according to a high efficiency video coding (HEVC) standard, wherein the CU is defined relative to a largest coding unit (LCU) according to a quadtree partitioning scheme, the method further comprising:
receiving LCU syntax data that defines the quadtree partitioning scheme; and
receiving mode information for the CU that defines the bi-predictive inter mode.

10. The method of claim 1, wherein the current video block comprises a prediction unit (PU) of a coding unit (CU) that is defined according to a high efficiency video coding (HEVC) standard, the method further comprising:
receiving mode information for the PU that defines the bi-predictive inter mode.

11. The method of claim 1, the method further comprising:
predictively decoding the current video block based on the first motion vector and the second motion vector.

12. The method of claim 1, wherein the candidate that is defined based on the first motion vector comprises a new MVP candidate that is defined based on the first MVD and the first MVP.

13. A method of encoding video data in which adaptive motion vector prediction (AMVP) is used to code a first motion vector and a second motion vector associated with a current video block in accordance with a bi-predictive inter mode that is based on a first reference block and a second reference video block, the method comprising:
determining the first motion vector to be used to code the current video block in the bi-predictive inter mode, wherein the first motion vector is a function of the current video block and the first reference video block;
identifying a first motion vector predictor (MVP) based on a first set of motion vector predictors;
generating a first index that identifies the first MVP;
generating a first motion vector difference (MVD) based on the first motion vector and the first MVP;
determining the second motion vector to be used to code the current video block in the bi-predictive inter mode;
identifying a second MVP based on a second set of motion vector predictors, wherein the second set of motion vector predictors includes a candidate motion vector predictor based on a scaled first motion vector, wherein the scaled first motion vector is formed by scaling the first motion vector by a scale factor that is function of a temporal distance from the current video block to the second reference video block and a temporal distance from the current video block to the first reference video block;
generating a second index that identifies the candidate motion vector predictor as the second MVP;
generating a second MVD based on the second motion vector and the second MVP; and
outputting the first index, the first MVD, the second index and the second MVD as part of an encoded bitstream for the current video block.

14. The method of claim 13, wherein the first motion vector and the second motion vector point to data associated with a same predictive frame, and wherein the candidate based on the first motion vector is the first motion vector.

15. The method of claim 13, wherein the first motion vector points to data associated with a previous frame and the second motion vector points to data associated with another previous frame, and wherein the candidate based on the first motion vector comprises a scaled version of the first motion vector.

16. The method of claim 13, wherein the first motion vector points to data associated with a subsequent frame and the second motion vector points to data associated with another subsequent frame, and wherein the candidate based on the first motion vector comprises a scaled version of the first motion vector.

17. The method of claim 13, wherein the first motion vector points to data associated with a previous frame and the second motion vector points to data associated with a subsequent frame, wherein the candidate based on the first motion vector comprises a scaled version of the first motion vector, and wherein a temporal distance of the previous frame relative to a current frame is the same as a temporal distance of the subsequent frame relative to the current frame.

18. The method of claim 13, wherein the first motion vector points to data associated with a subsequent frame and the second motion vector points to data associated with a previous frame, wherein the candidate based on the first motion vector comprises a scaled version of the first motion vector, and wherein a temporal distance of the subsequent frame relative to a current frame is the same as a temporal distance of the previous frame relative to the current frame.

19. The method of claim 13, wherein the first motion vector points to data associated with a previous frame and the second motion vector points to data associated with a subsequent frame, wherein the candidate based on the first motion vector comprises a scaled version of the first motion vector, and wherein a temporal distance of the previous frame relative to a current frame is different than a temporal distance of the subsequent frame relative to the current frame.

20. The method of claim 13, wherein the first motion vector points to data associated with a subsequent frame and the second motion vector points to data associated with a previous frame, wherein the candidate based on the first motion vector comprises a scaled version of the first motion vector, and wherein a temporal distance of the subsequent frame relative to a current frame is different than a temporal distance of the previous frame relative to the current frame.

21. The method of claim 13, wherein the current video block comprises one of:
   a coding unit (CU) defined according to a high efficiency video coding (HEVC) standard, wherein the CU is defined relative to a largest coding unit (LCU) according to a quadtree partitioning scheme; or
   a prediction unit (PU) of the CU that is defined according to the HEVC standard.

22. The method of claim 13, wherein the candidate based on the first motion vector comprises a new MVP candidate that is defined based on the first MVD and the first MVP.

23. A video decoding device that decodes video data encoded in a bi-predictive inter mode that is based on a first reference block and a second reference video block, the video decoding device comprising:
   a memory; and
   a video decoder, connected to the memory, wherein the video decoder is configured to:
   receive a first motion vector difference (MVD) associated with the first motion vector;
   receive a first index that identifies a first motion vector predictor (MVP), selected from a first set of motion vector predictors;
   generate the first motion vector based on the first MVD and the first MVP, the first motion vector a function of the current video block and the first reference video block;
   receive a second MVD associated with the second motion vector;
   receive a second index that identifies a second MVP, wherein the second MVP is selected from a second set of motion vector predictors, the second set of motion vector predictors including a candidate motion vector predictor that is a function of a scaled first motion vector found by scaling the first motion vector by a scale factor that is function of a temporal distance from the current video block to the second reference video block and a temporal distance from the current video block to the first reference video block; and
   generate the second motion vector based on the second MVD and the candidate motion vector predictor.

24. The video decoding device of claim 23, wherein the first motion vector and the second motion vector point to data associated with a same predictive frame, and the second MVP is the first motion vector.

25. The video decoding device of claim 23, wherein the first motion vector points to data associated with a previous frame and the second motion vector points to data associated with another previous frame, wherein the second MVP comprises a scaled version of the first motion vector.

26. The video decoding device of claim 23, wherein the first motion vector points to data associated with a subsequent frame and the second motion vector points to data associated with another subsequent frame, wherein the second MVP comprises a scaled version of the first motion vector.

27. The video decoding device of claim 23, wherein the first motion vector points to data associated with a previous frame and the second motion vector points to data associated with a subsequent frame, wherein the second MVP comprises a scaled version of the first motion vector, wherein a temporal distance of the previous frame relative to a current frame is the same as a temporal distance of the subsequent frame relative to the current frame.

28. The video decoding device of claim 23, wherein the first motion vector points to data associated with a subsequent frame and the second motion vector points to data associated with a previous frame, wherein the second MVP comprises a scaled version of the first motion vector, wherein a temporal distance of the subsequent frame relative to a current frame is the same as a temporal distance of the previous frame relative to the current frame.

29. The video decoding device of claim 23, wherein the first motion vector points to data associated with a previous frame and the second motion vector points to data associated with a subsequent frame, wherein the second MVP comprises a scaled version of the first motion vector, wherein a temporal distance of the previous frame relative to a current frame is different than a temporal distance of the subsequent frame relative to the current frame.

30. The video decoding device of claim 23, wherein the first motion vector points to data associated with a subsequent frame and the second motion vector points to data associated with a previous frame, wherein the second MVP comprises a scaled version of the first motion vector, wherein a temporal distance of the subsequent frame relative to a current frame is different than a temporal distance of the previous frame relative to the current frame.

31. The video decoding device of claim 23, wherein the current video block comprises a coding unit (CU) defined according to a high efficiency video coding (HEVC) standard, wherein the CU is defined relative to a largest coding unit (LCU) according to a quadtree partitioning scheme, the video decoder further configured to:
   receive LCU syntax data that defines the quadtree partitioning scheme; and
   receive mode information for the CU that defines the bi-predictive inter mode.

32. The video decoding device of claim 23, wherein the current video block comprises a prediction unit (PU) of a coding unit (CU) that is defined according to a high efficiency video coding (HEVC) standard, wherein the video decoder:
   receives mode information for the PU that defines the bi-predictive inter mode.

33. The video decoding device of claim 23, wherein the video decoder predictively decodes the current video block based on the first motion vector and the second motion vector.

34. The video decoding device of claim 23, wherein the video decoder includes:
   an entropy decoding unit configured to receive and entropy decode the first MVD, the first index, the second MVD, and the second index; and
   a prediction unit configured to generate the first motion vector based on the first MVD and the first MVP, and generate the second motion vector based on the second MVD and the second MVP.

35. The video decoding device of claim 23, wherein the video decoding device comprises one or more of an integrated circuit; a microprocessor; or a wireless communication device that includes a video decoder.

36. The video decoding device of claim 23, wherein the candidate that is defined based on the first motion vector comprises a new MVP candidate that is defined based on the first MVD and the first MVP.

37. A video encoding device that encodes video data in a current video block in a bi-predictive inter mode that is based on a first reference block and a second reference video block, the video encoding device comprising:
 a memory; and
 a video encoder connected to the memory, wherein the video encoder is configured to:
  determine a first motion vector to be used to code the current video block in the bi-predictive inter mode, wherein the first motion vector is based on the current video block and the first reference video block;
  identify a first motion vector predictor (MVP) based on a first set of motion vector predictors;
  generate a first index that identifies the first MVP;
  generate a first motion vector difference (MVD) based on the first motion vector and the first MVP;
  determine a second motion vector to be used to code the current video block in the bi-predictive inter mode, wherein the second motion vector is based on the current video block and the second reference video block;
  identify a second MVP based on a second set of motion vector predictors, wherein the second set of motion vector predictors includes a candidate motion vector predictor based on a scaled first motion vector, wherein the scaled first motion vector is formed by scaling the first motion vector by a scale factor that is function of a temporal distance from the current video block to the second reference video block and a temporal distance from the current video block to the first reference video block;
  generate a second index that identifies the candidate motion vector predictor as the second MVP;
  generate a second MVD based on the second motion vector and the second MVP; and
  output the first index, the first MVD, the second index and the second MVD as part of an encoded bitstream for the current video block.

38. The video encoding device of claim 37, wherein the first motion vector and the second motion vector point to data associated with a same predictive frame, and wherein the candidate based on the first motion vector is the first motion vector.

39. The video encoding device of claim 37, wherein the first motion vector points to data associated with a previous frame and the second motion vector points to data associated with another previous frame, and wherein the candidate based on the first motion vector comprises a scaled version of the first motion vector.

40. The video encoding device of claim 37, wherein the first motion vector points to data associated with a subsequent frame and the second motion vector points to data associated with another subsequent frame, and wherein the candidate based on the first motion vector comprises a scaled version of the first motion vector.

41. The video encoding device of claim 37, wherein the first motion vector points to data associated with a previous frame and the second motion vector points to data associated with a subsequent frame, wherein the candidate based on the first motion vector comprises a scaled version of the first motion vector, and wherein a temporal distance of the previous frame relative to a current frame is the same as a temporal distance of the subsequent frame relative to the current frame.

42. The video encoding device of claim 37, wherein the first motion vector points to data associated with a subsequent frame and the second motion vector points to data associated with a previous frame, wherein the candidate based on the first motion vector comprises a scaled version of the first motion vector, and wherein a temporal distance of the subsequent frame relative to a current frame is the same as a temporal distance of the previous frame relative to the current frame.

43. The video encoding device of claim 37, wherein the first motion vector points to data associated with a previous frame and the second motion vector points to data associated with a subsequent frame, wherein the candidate based on the first motion vector comprises a scaled version of the first motion vector, and wherein a temporal distance of the previous frame relative to a current frame is different than a temporal distance of the subsequent frame relative to the current frame.

44. The video encoding device of claim 37, wherein the first motion vector points to data associated with a subsequent frame and the second motion vector points to data associated with a previous frame, wherein the candidate based on the first motion vector comprises a scaled version of the first motion vector, and wherein a temporal distance of the subsequent frame relative to a current frame is different than a temporal distance of the previous frame relative to the current frame.

45. The video encoding device of claim 37, wherein the current video block comprises one of:
 a coding unit (CU) defined according to a high efficiency video coding (HEVC) standard, wherein the CU is defined relative to a largest coding unit (LCU) according to a quadtree partitioning scheme; or
 a prediction unit (PU) of the CU that is defined according to the HEVC standard.

46. The video encoding device of claim 37, wherein the video encoding device comprises one or more of:
 an integrated circuit;
 a microprocessor; or
 a wireless communication device that includes a video encoder.

47. The video encoding device of claim 37, wherein the candidate based on the first motion vector comprises a new MVP candidate that is defined based on the first MVD and the first MVP.

48. A device for decoding video data in which adaptive motion vector prediction (AMVP) is used to code a first motion vector and a second motion vector associated with a current video block that is coded in a bi-predictive inter mode that is based on a first reference block and a second reference video block, the device comprising:
 means for receiving a first motion vector difference (MVD) associated with the first motion vector;
 means for receiving a first index that identifies a first motion vector predictor (MVP), the first MVP selected from a first set of motion vector predictors;
 means for generating the first motion vector based on the first MVD and the first MVP, the first motion vector a function of the current video block and the first reference video block;
 means for receiving a second MVD associated with the second motion vector;
 means for receiving a second index that identifies a second MVP, wherein the second MVP is selected from a second set of motion vector predictors, the second set of vectors motion vector predictors including a candidate motion vector predictor that is a function of a scaled first motion vector found by scaling the first motion vector by a scale factor that is function of a temporal distance from the current video block to the second reference video block and a temporal distance from the current video block to the first reference video block; and means for generating the second motion vector based on the second MVD and the candidate motion vector predictor.

49. A device for encoding video data in which adaptive motion vector prediction (AMVP) is used to code a first motion vector and a second motion vector associated with a current video block in accordance with a bi-predictive inter mode that is based on a first reference block and a second reference video block, the device comprising:

means for determining the first motion vector to be used to code the current video block in the bi-predictive inter mode, wherein the first motion vector is a function of the current video block and the first reference video block;

means for identifying a first motion vector predictor (MVP) based on a first set of motion vector predictors;

means for generating a first index that identifies the first MVP;

means for generating a first motion vector difference (MVD) based on the first motion vector and the first MVP;

means for determining the second motion vector to be used to code the current video block in the bi-predictive inter mode;

means for identifying a second MVP based on a second set of motion vector predictors, wherein the second set of motion vector predictors includes a candidate motion vector predictor based on a scaled first motion vector, wherein the scaled first motion vector is formed by scaling the first motion vector by a scale factor that is function of a temporal distance from the current video block to the second reference video block and a temporal distance from the current video block to the first reference video block;

means for generating a second index that identifies the candidate motion vector predictor as the second MVP;

means for generating a second MVD based on the second motion vector and the second MVP; and means for outputting the first index, the first MVD, the second index and the second MVD as part of an encoded bitstream for the current video block.

50. A non-transitory computer-readable medium comprising instructions that upon execution cause a processor to decode video data in which adaptive motion vector prediction (AMVP) is used to code a first motion vector and a second motion vector associated with a current video block that is coded in a bi-predictive inter mode that is based on a first reference block and a second reference video block, wherein the instructions cause the processor to:

upon receiving a first motion vector difference (MVD) associated with the first motion vector, and upon receiving a first index that identifies a first motion vector predictor (MVP), the first MVP selected from a first set of motion vector predictors, generate the first motion vector based on the first MVD and the first MVP, the first motion vector associated with the current video block and the first reference video block; and upon receiving a second MVD associated with the second motion vector, and upon receiving a second index that identifies a second MVP, wherein the second MVP is selected from a second set of motion vector predictors, the second set of motion vector predictors including a candidate motion vector predictor that is a function of a scaled first motion vector found by scaling the first motion vector by a scale factor that is function of a temporal distance from the current video block to the second reference video block and a temporal distance from the current video block to the first reference video block, generate the second motion vector based on the second MVD and the candidate motion vector predictor.

51. A non-transitory computer-readable medium comprising instructions that upon execution cause a processor to encode video data in which adaptive motion vector prediction (AMVP) is used to code a first motion vector and a second motion vector associated with a current video block in accordance with a bi-predictive inter mode that is based on a first reference block and a second reference video block, wherein the instructions cause the processor to:

determine the first motion vector to be used to code the current video block in the bi-predictive inter mode, wherein the first motion vector is a function of the current video block and the first reference video block;

identify a first motion vector predictor (MVP) based on a first set of motion vector predictors;

generate a first index that identifies the first MVP;

generate a first motion vector difference (MVD) based on the first motion vector and the first MVP;

determine the second motion vector to be used to code the current video block in the bi-predictive inter mode;

identify a second MVP based on a second set of motion vector predictors, wherein the second set of motion vector predictors includes a candidate motion vector predictor based on a scaled first motion vector, wherein the scaled first motion vector is formed by scaling the first motion vector by a scale factor that is function of a temporal distance from the current video block to the second reference video block and a temporal distance from the current video block to the first reference video block;

generate a second index that identifies the candidate motion vector predictor as the second MVP;

generate a second MVD based on the second motion vector and the second MVP; and output the first index, the first MVD, the second index and the second MVD as part of an encoded bitstream for the current video block.

* * * * *